US009665366B2

(12) United States Patent
Kuchibhotla et al.

(10) Patent No.: US 9,665,366 B2
(45) Date of Patent: May 30, 2017

(54) CREATION OF A SOFTWARE CONFIGURATION SIGNATURE FOR SOFTWARE

(71) Applicant: Oracle International Corporation, Redwood Shores, CA (US)

(72) Inventors: Balasubrahmanyam Kuchibhotla, San Ramon, CA (US); Bharat Paliwal, Fremont, CA (US); Hariprasanna Srinivasan, San Francisco, CA (US); Kamaldeep Khanuja, Fremont, CA (US); Shachi Sanklecha, Bangalore (IN); Mahesh Vasishtha, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/603,775

(22) Filed: Jan. 23, 2015

(65) Prior Publication Data

US 2016/0092210 A1    Mar. 31, 2016

Related U.S. Application Data

(60) Provisional application No. 62/056,391, filed on Sep. 26, 2014.

(51) Int. Cl.
 *G06F 9/44* (2006.01)
 *G06F 9/445* (2006.01)
(52) U.S. Cl.
 CPC ............ *G06F 8/71* (2013.01); *G06F 8/60* (2013.01); *G06F 8/65* (2013.01)
(58) Field of Classification Search
 None
 See application file for complete search history.

(56) References Cited

U.S. PATENT DOCUMENTS 6,971,093 B1 * 11/2005 Spring ................... G06F 8/71
                                                           717/170
7,213,232 B1    5/2007 Knowles
(Continued)

OTHER PUBLICATIONS

Hall et al., "A cooperative approach to support software deployment using the Software Dock," 1999, Proceedings of the 1999 International Conference on Software Engineering, pp. 174-183.*

(Continued)

*Primary Examiner* — Thuy Dao
*Assistant Examiner* — Stephen Berman
(74) *Attorney, Agent, or Firm* — Invoke

(57) ABSTRACT

Techniques are described for generating configuration level signatures. In an embodiment, one or more computing devices are used to generate a first signature for a particular software deployment that is configured at a particular configuration level. The first signature is generated based on digest information that identifies a plurality of deployed source components for the particular software deployment. Mapping data is stored that maps the first signature to the digest information identifying the plurality of deployed source components for the particular software deployment. A second signature is generated based on information that defines target source components for a set of software deployments that includes the particular software deployment. The first signature is compared with the second signature to determine whether the deployed source components satisfy the target source components. An indication of whether the deployed source components satisfy the target source components is stored.

18 Claims, 25 Drawing Sheets

(56) References Cited

U.S. PATENT DOCUMENTS

| | | | |
|---|---|---|---|
| 7,458,073 B1 | 11/2008 | Darling et al. | |
| 7,624,377 B2 | 11/2009 | Wu | |
| 7,827,547 B1 | 11/2010 | Sutherland et al. | |
| 7,908,589 B2 | 3/2011 | Sattler et al. | |
| 8,082,406 B1* | 12/2011 | Singh et al. | G06F 11/2094 711/161 |
| 8,219,653 B1* | 7/2012 | Keagy et al. | G06F 8/63 709/222 |
| 8,281,307 B2 | 10/2012 | Arnold et al. | |
| 8,347,263 B1 | 1/2013 | Offer | |
| 8,402,437 B2 | 3/2013 | Dhanakshirur et al. | |
| 8,490,054 B2 | 7/2013 | Dattathreya | |
| 8,667,465 B2 | 3/2014 | Poole | |
| 8,762,945 B2 | 6/2014 | Arnold et al. | |
| 2004/0044996 A1* | 3/2004 | Atallah | G06F 8/71 717/169 |
| 2005/0044057 A1* | 2/2005 | Bluvshteyn et al. | G06F 8/60 |
| 2006/0150176 A1* | 7/2006 | Dorricott et al. | G06F 8/65 717/168 |
| 2007/0220507 A1* | 9/2007 | Back et al. | G06F 8/71 717/170 |
| 2009/0064122 A1* | 3/2009 | Bielski | G06F 8/65 717/168 |
| 2009/0307685 A1* | 12/2009 | Axnix et al. | G06F 8/60 717/174 |
| 2011/0138461 A1* | 6/2011 | Bhargava et al. | G06F 21/554 726/21 |
| 2011/0225275 A1 | 9/2011 | Shah et al. | |
| 2012/0079471 A1* | 3/2012 | Vidal et al. | G06F 8/65 717/169 |
| 2013/0274006 A1* | 10/2013 | Hudlow et al. | G07F 17/3223 463/29 |
| 2013/0275376 A1* | 10/2013 | Hudlow et al. | H04L 67/34 707/639 |
| 2013/0297579 A1* | 11/2013 | Andrew et al. | G06F 8/71 707/698 |
| 2013/0305239 A1* | 11/2013 | Traut et al. | G06F 8/36 717/174 |
| 2014/0279985 A1* | 9/2014 | Fontenot et al. | G06F 21/51 707/698 |
| 2015/0095468 A1* | 4/2015 | Benny et al. | H04L 41/0853 709/220 |

OTHER PUBLICATIONS

Kwok et al., "A Software as a Service with Multi-tenancy Support for an Electronic Contract Management Application," 2008, IEEE International Conference on Services Computing, pp. 179-186.*
Dearle, "Software Deployment, Past, Present and Future," 2007, Proceeding FOSE '07 2007 Future of Software Engineering, pp. 269-284.*
Ping et al., A Change-Oriented Conceptual Framework of Software Configuration Management, IEEE, pp. 1-4, dated 2007.
Faulkes et al., Software Configuration Management and Its Contribution to Reliability Program Management:, IEEE Transactions on Reliability, vol. R-32, No. 3, pp. 289-292, dated 1983.

* cited by examiner

CREATION OF A SOFTWARE CONFIGURATION SIGNATURE FOR SOFTWARE

CROSS-REFERENCE TO RELATED APPLICATIONS; BENEFIT CLAIM

This application claims the benefit of Provisional Application No. 62/056,391, filed Sep. 26, 2014, the entire contents of which is hereby incorporated by reference as if fully set forth herein, under 35 U.S.C. §119(e).

This application is related to U.S. application Ser. No. 14/603,741, filed Jan. 23, 2015, entitled "Image Advisor"; U.S. application Ser. No. 14/603,764, filed Jan. 23, 2015, entitled "Populating Content for a Base Version of an Image"; U.S. application Ser. No. 14/603,532, filed Jan. 23, 2015, entitled "Version Management of Images"; U.S. application Ser. No. 14/603,804, filed Jan. 23, 2015, entitled "Drift Management of Images"; and Provisional Application No. 62/056,412, filed Sept. 26, 2014, the entire contents for each of which is hereby incorporated by reference as if fully set forth herein.

This application is also related to U.S. application Ser. No. 13/832,381, the entire contents of which is hereby incorporated by reference as if fully set forth herein.

TECHNICAL FIELD

The present disclosure relates to standardization of deployed resources. The disclosure relates more specifically to computer-implemented techniques for recommending, creating, and managing standardized configuration levels across different target software deployments.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many datacenters undergo two major types of transformations over time. First, a typical datacenter experiences significant growth with an ever increasing number of software deployments. Second, the software architecture within the datacenter is typically improved or updated with advancements in technology or changes to the underlying deployment models. These transformations frequently lead to software deployments that are siloed, dispersed, varied and complex. Some enterprise deployments have hundreds and thousands of software deployments across multiple versions and various software patch levels.

The ever-increasing and divergent nature of software deployments within a datacenter leads to significant challenges for system administrators. A large, varied, distributed environment may demand quite a number of out of band emergency and ad-hoc changes to keep the systems performing properly. As the differences continue to exist and grow with additional deployments and updates, the risk of unpredictable failures and unplanned downtimes may increase. In addition, the varied and complex nature of the software deployments may result in poor resource utilization and cause issues with planned maintenance windows.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

Figure 1:
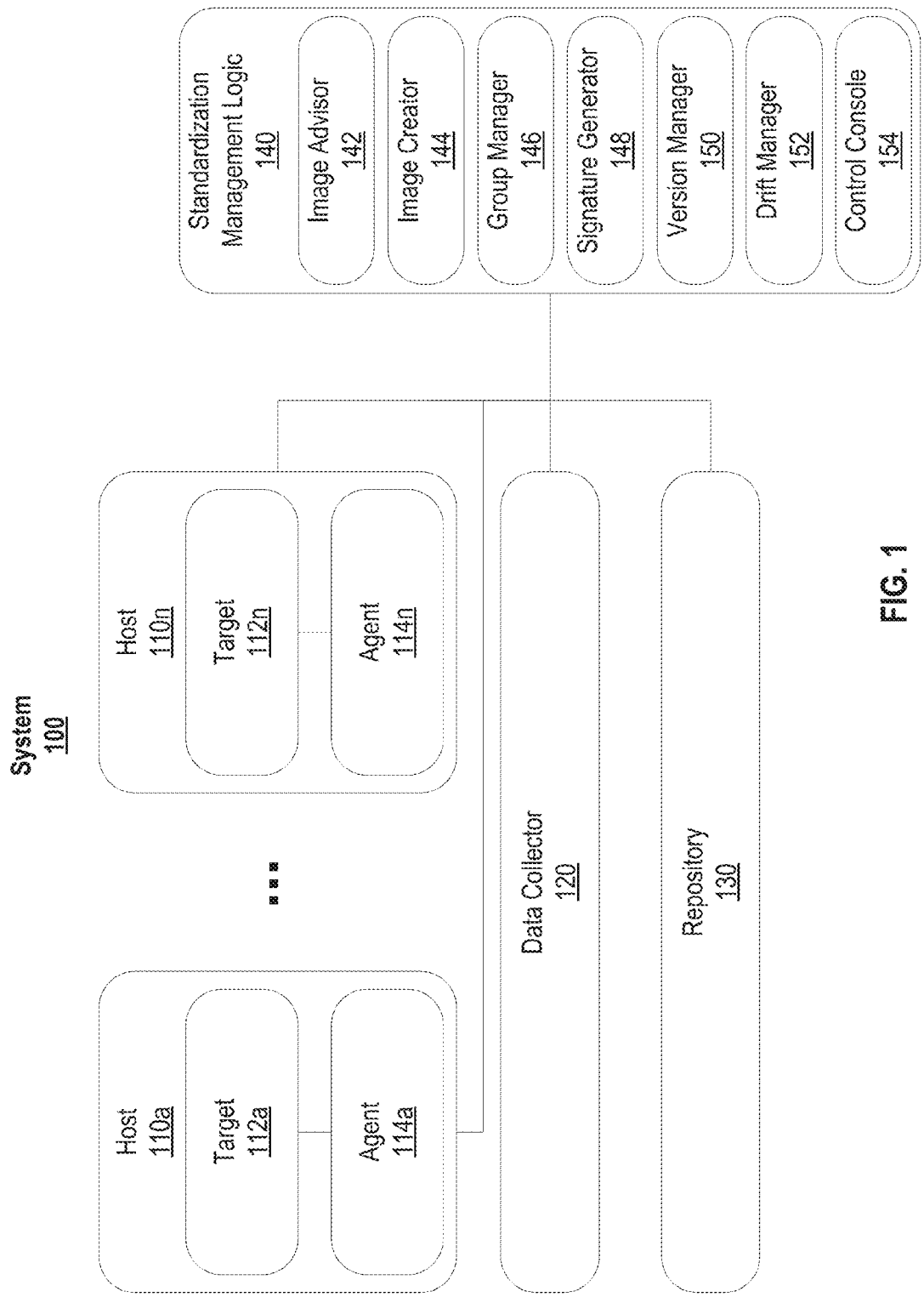
FIG. 1 illustrates an example system for managing standards of deployed resources.

In the following description, for the purposes of explanation, numerous specific details are set forth in order to provide a thorough understanding of the disclosure. It will be apparent, however, that the present invention may be practiced without these specific details. In other instances, structures and devices are shown in block diagram form in order to avoid unnecessarily obscuring the present invention.

Image Advisor General Overview

In various embodiments, computer systems, stored instructions, and technical steps are described for generating recommendations for reducing configuration pollution. The recommendations may generally identify ways in which the number of different software configurations within a managed environment may be minimized or otherwise reduced. By reducing pollution, the environment may become more manageable and secure. In addition, the amount of computing resources that are consumed by siloed, dispersed, varied, and complex deployments may be significantly improved.

According to one embodiment, an image advisor includes logic and interfaces for generating a set of software configuration classifications based on a set of attributes associated with a plurality of targets. The image advisor associates each respective software configuration classification in the set of software configuration classifications with one or more targets of the plurality of targets. For each respective software configuration classification in the set of software configuration classifications, the image advisor generates and provides a recommendation that identifies a recommended set of source components for the one or more targets of the plurality of targets.

In another embodiment, the image advisor includes logic for and interfaces for determining a set of current software configuration levels based on a set of one or more attributes associated with a plurality of targets. Each respective current software configuration level in the set of software configuration levels may be associated with at least one target, of the plurality of targets, that is currently configured at the respective current software configuration level. The image advisor further determines a set of recommended software configuration levels based on the set of one or more attributes associated with the plurality of targets. Each recommended software configuration level in the set of recommended software configuration levels is for at least one target of the plurality of targets. The image advisor may display the current configuration levels and/or the set of recommended software configuration levels.

Populating Content General Overview

Software resources within a datacenter or other managed environment may be deployed at varying levels of configuration. For example, different deployments of a software resource may have different levels of patches such that one or more patches are applied at one deployment that have not been applied at another deployment. The number of potential configurations may negatively impact manageability and complicate standardization across the different deployments.

In various embodiments, computer systems, stored instructions, and technical steps are described for determining a recommended standard software configuration level for a plurality of software deployments that may be at varying levels of configuration. Based on the determination, an image may be generated that satisfies the recommended standard set of source components. The image may be used to update software deployments that do not satisfy the recommended standard.

In one embodiment, a base version of an image is created based on an analysis of the patch levels of a plurality of target software deployments. The patch information may be normalized across the plurality of target software deployments to provide a list of patches to include in the recommended standard and base version of the image.

In one embodiment, recommended patch information is further augmented with external recommendations from a service provider. The external recommendations may include tenant-generic patch recommendations, such as global vendor recommendations for a particular software product, or tenant-specific patch recommendations, such as patches for diagnosed support tickets. The augmented patch information may be incorporated into a base version of the image that is created for the plurality of target software deployments. The recommendations may be used to determine which level of configuration to recommend as a standard.

Software Configuration Signature Overview

Many attributes may be involved in describing the configuration level associated with a particular software deployment. For example, an example description may include attributes that identify a name, release date, and platform of the product as well as information that uniquely identifies each patch applied, if any. As another example, a composite target may be composed of a plurality of different software products/applications or other elements. Each software application may comprise a plurality of plug-ins or other sub-elements, and each sub-element may be independently updatable with its own lifecycles and patches. Given such complexities, determining the configuration level for a particular target may be a time-intensive process involving a great number of attribute comparisons and consuming valuable processing resources.

In various embodiments, computer systems, stored instructions, and technical steps are described for generating a software configuration level signature. The configuration level signature allows for quick comparisons of the configuration levels of targets and for compliance checks to determine whether a particular target meets a particular configuration level. The configuration level signature further provides scalability in performing configuration comparisons as the number of deployments increase rapidly.

In one embodiment, a software configuration level signature is generated for a target software deployment based on digest information associated with the software deployment. The digest information may comprise an ordered set of attributes that describe or otherwise identify a set of source components from which software deployment is run. For example, the digest information may identify a software system's base version and all the patches applied to the software system. The digest information may further identify all the components within a software image and its corresponding patch levels. In a composite system, the components may include a parent software unit and independent but associated child software pieces that are collectively part of the parent software unit. Each component may have a lifecycle of its own. The configuration level signature may be stored as a target property for the associated software deployment.

In another embodiment, a signature is generated for a target set of source components. This signature may be compared against a set of one or more signatures that are associated with one or more respective software deployments. If the signature of a particular software deployment does not match the signature for the target set of source components, then the software deployment may be classified as non-compliant.

Version Management Overview

Standards within datacenters and other environments may evolve over time. For example, software deployments may continuously be added, patched, or otherwise modified. As software upgrades and other patches are released, the standards may be updated to capture such changes.

In various embodiments, computer systems, stored instructions, and technical steps are described for managing standards for groups of target software deployments. In one embodiment, subscription data is maintained for a group of target software deployments that subscribe to a gold image. A gold image represents a standard to follow for the subscribed targets. The group of targets may be referred to as a "flocking group" as the targets follow the lead of the gold image and, thus, "flock" together. If the gold image changes, then the subscribed targets follow and apply the changes to keep up with the latest standards.

Multiple image versions of a gold image may be maintained. Each different version represents a different level of configuration and tracks the evolution of the gold image standard over time. For example, when a new version of an image is created, one or more subsequent versions may remain active. This allows subscribed targets time to change to the new standard, preventing unwanted and potentially damaging interruptions.

In one embodiment, creation of a new version of an image results in revising of an end-state definition of the image and the corresponding payload creation. Creation of a new image version may include computation of additional patches from one or more sources.

A new version of an image may follow a particular lifecycle. In one embodiment, the image version transitions through a plurality of states including one or more of a draft state, an active restricted state, an active current state, an active state, and/or a retired state.

Drift Management Overview

Different software deployments that initially share the same level of configuration may drift over time. For example, ad hoc updates or other patches may be applied at one target deployment that are not applied to the other, or some updates may not be applied at certain targets due to error or rollback. If left unmanaged, software deployments may drift further apart as more patches are released and applied.

In various embodiments, computer systems, stored instructions, and technical steps are described for managing drift amongst a plurality of software deployments that follow a standard. By preventing or reducing drift, standards that span a potentially large number of software deployments may be more easily maintained. This allows for a more manageable and secure environment and may optimize resource utilization by preventing deployments from becoming too siloed, dispersed, complex, and varied.

In one embodiment, an end state definition is stored that identifies a standard level of configuration for a plurality of target software deployments. A drift management system may determine if a target software deployment has drifted from the standard level of configuration identified by the end state definition. If at least one target software deployment has drifted, the drift management system may perform reconciliation to bring the drifter back into compliance with the standards.

Standardization Management System

Techniques described herein may be implemented by a standardization management system that provides a centralized location from which to track monitor, and maintain deployments of software resources within a datacenter or other managed environment. The standardization management system may support a variety of functions relating to standardization of the software resources including, without limitation:

identifying different configurations associated with targets that are deployed within a datacenter, cloud, or other environment;

recommending standardized configurations for groups of targets based on classifications of the targets;

generating gold images representing standardized configurations for different respective groups of targets;

generating and decomposing signatures that uniquely represent a standardized configuration;

maintaining multiple versions of gold images for a group of targets;

managing targets that drift from a gold image standard; and/or presenting dashboards and/or other graphical user interface (GUI) elements for streamlining the standardization process.

FIG. 1 illustrates an example system for managing standards of deployed resources, according to an embodiment. System 100 generally comprises host 110a to 110n, data collector 120, repository 130, and standardization management logic 140. Components of system 100 may be implemented in one or more datacenters, one or more clouds, and/or one or more other networked environments.

Hosts 110a to 110n represent a set of one or more network hosts and generally comprise targets 112a to 112n and agents 114a to 114n. Each agent is a process, such as a service or daemon, that executes on the corresponding host machine and monitors one or more respective targets. A "target" in this context refers to a software deployment, where a software deployment may include, without limitation, applications, system programs, development software, and/or other software systems that are deployed within system 100. A target is run from a set of source components, where the source components for a software deployment include, without limitation, sets of instructions and/or configurations that have been made as the result of, for example, patching configuring, modifying, updating, or newly provisioning or initializing software. The term "source components for a software deployment" is used interchangeably herein with the term "level of configuration for the software deployment."

Although only one agent and target is illustrated per host in FIG. 1, the number of agents and/or targets per host may vary from implementation to implementation. For example, multiple agents may be installed on a given host to monitor different target applications or other resources.

Agents 114a to 114n are communicatively coupled with data collector 120 and send the collected data to data collector 120 according to one or more communication protocols. Example communication protocols that may be used to transport data between the agents and data collector 120 include, without limitation, the hypertext transfer protocol (HTTP), simple network management protocol (SNMP), and other communication protocols of the internet protocol suite.

Data collector 120 aggregates data collected or otherwise received from agents 114a to 114n and stores the aggregated data in repository 130. In an embodiment, data collector 120 is executed by one of hosts 110a to 110n. Alternatively, data collector 120 is executed on a different host machine that does not execute any agents. Similarly, repository 130 and standardization management logic 140 may reside on any of the illustrated host machines or may be implemented on a separate host or set of hosts including, without limitation, in the cloud.

Standardization management logic 140 manages various aspects relating to standardization of resources deployed on hosts 110a to 110n. Standardization management logic 140 may include, without limitation, image advisor 142, image creator 144, group manager 146, signature generator 148, version manager 150, and/or drift manager 152. Each of these components supports a distinct set of functions as described in further detail herein.

Standardization management logic 140 may further comprise control console 154, which provides a user interface that allows a user to monitor and administer, locally or from a remote network location, the standardization processes described herein. The user interface may comprise, without limitation, a graphical user interface (GUI), an application programming interface (API), a command-line interface (CLI) or some other means of interacting with a user. A "user" in this context may include, without limitation, an application or a human user such as a system administrator.

Configuration Identification and Classification

In one embodiment, image advisor 142 includes logic for identifying and classifying a current set of source components for targets 112a to 112n. For example, image advisor 142 may determine how many different software versions and patches are deployed within system 100. Image advisor 142 may classify the current set of source components of a target based on a set of attributes that describe or otherwise identify how the target is configured. By identifying the current levels of configuration and the source components for targets 112a to 112n, a complete picture of configuration pollution, if any, within system 100 may be formed.

The set of source components and configuration level for different software deployments may be classified based on primary attributes and secondary attributes. A primary attribute is an attribute that does not change between different deployments of the same software resource. Primary attributes may be used to describe a base version of a software deployment. Example primary attribute may include, without limitation:

Target type: This attribute primarily classifies targets at the product level, such as identifying the product name and or vendor. This attribute may further identify the architecture model of the product. For example, some database management systems support deployment on a standalone server, within a clustered environment, etc.

Software release version: This attribute identifies the release version of the target resource. There may be multiple release versions available in a data center environment. A given release may have multiple deployments with varying patches.

Operating system (or platform) version: This attribute identifies an operating system (OS) or other platform where the software is hosted. There may be more than one OS type in a datacenter. Thus, the same product may be classified differently when executed on different platforms.

Targets may further be classified based on an applied patches attribute. This attribute identifies critical patch updates (CPU), patch set updates (PSUs) or other patches have been applied at the target. A "patch" as used herein may comprise a plug-in, bug fix, feature improvement, custom-defined modification and/or some other update to a software deployment. The patch may change the program executable when applied. Different deployments of the same version of an application may have patches that were applied at one target, but not another.

Secondary attributes are attributes that may differ between different deployments of the same software resource. Secondary attributes may be used to fine grain the configuration classification of a target further. Examples of secondary attributes may include, without limitation:

Supported application: This attribute identifies applications that are supported by a target. For example, a database management system may be used to support customer relationship management (CRM) applications, business intelligence (BI) applications, etc.

Location: This attribute identifies a location of the target. For example, a given application may be deployed in geographically distinct data centers that are managed by the same standardization management logic. The attribute may identify the geographic region and/or particular datacenter to which the target belongs.

Line of Business: This attribute identifies a line-of-business (LOB) supported by the target. For example, the LOB may include different categories such as accounting, supply chain management, human resources, etc.

Tenant: This attribute identifies a tenant with which the target is associated. Some datacenters support multi-tenant environments, where different targets belong to or are otherwise associated with different tenants.

Custom properties: A user may create custom properties for the targets. For example, an administrator may define a security level attribute to classify highly sensitive targets separately from other targets within the same data center.

In one embodiment, data collector 120 collects and stores one or more of the above attributes in repository 130 for each of targets 112a to 112n. Once collected, image advisor 142 scans the target properties to determine the current software configurations for targets 112a to 112n. Image advisor 142 then uses the attributes to identify all unique software configurations within system 100. For example, all targets that share a common target type, software release, operating system, and patch set update may be grouped into a single, unique configuration classification. In other examples, additional secondary attributes may be used to fine grain the classifications. For instance, groups that belong to different locations, LOBs, and/or tenants may be grouped separately. Image advisor 142 may the different configuration classifications and how many targets belong to each different configuration classification to a user, as described further below.

The primary and secondary attributes identified above a given by way of example, but may vary from implementation to implementation. For example, in some software deployments, one or more of the primary attributes identified above may be a secondary attribute or vice versa. In some embodiments, primary and secondary attributes may be determined based on domain-specific rules or other information that apply to a particular application domain. Thus, the primary attributes that define one software configuration classification may differ from the primary attributes of another software configuration classification.

Recommended End State Configuration Levels

In one embodiment, image advisor 142 includes logic for determining and generating recommended software source components for targets 112a to 112n. A logical description of the recommended configuration level is herein referred to as an "end state definition." The end state definition comprises data that defines or otherwise identifies the recommended set of source components in terms of one or more recommended target attributes. For example, the end state definition may specify the target type, software version, operating system, and patches that are recommended for a group of targets.

In one embodiment, image advisor 142 computes an initial end-state definition based on an analysis of target attributes for targets 112a to 112n. To compute the initial end-state definition, image advisor may perform a coarse classification based on the primary attributes. With a coarse classification, targets that are associated with the same primary attributes (e.g., target type, software version, and platform) are assigned or otherwise associated with a particular end-state definition even though the secondary attributes of the targets may differ. In this scenario, the primary attributes act as a least common denominator for grouping targets. Thus, targets with common primary attributes share the same recommended set of source components.

Image advisor 142 may also use one or more secondary attributes to generate and/or refine the initial end-state definitions. Targets with different secondary attributes or combinations of secondary attributes may be classified in different groups even though the targets may share the same primary attributes. For example, a target application at one location with the same primary attribute as a target application at a second location may be associated with a different recommended set of source components and end state definition. In addition or as an alternative to location, one or more other secondary attributes may be used in the analysis, allowing for different levels of granularity when classifying targets.

Figure 2:
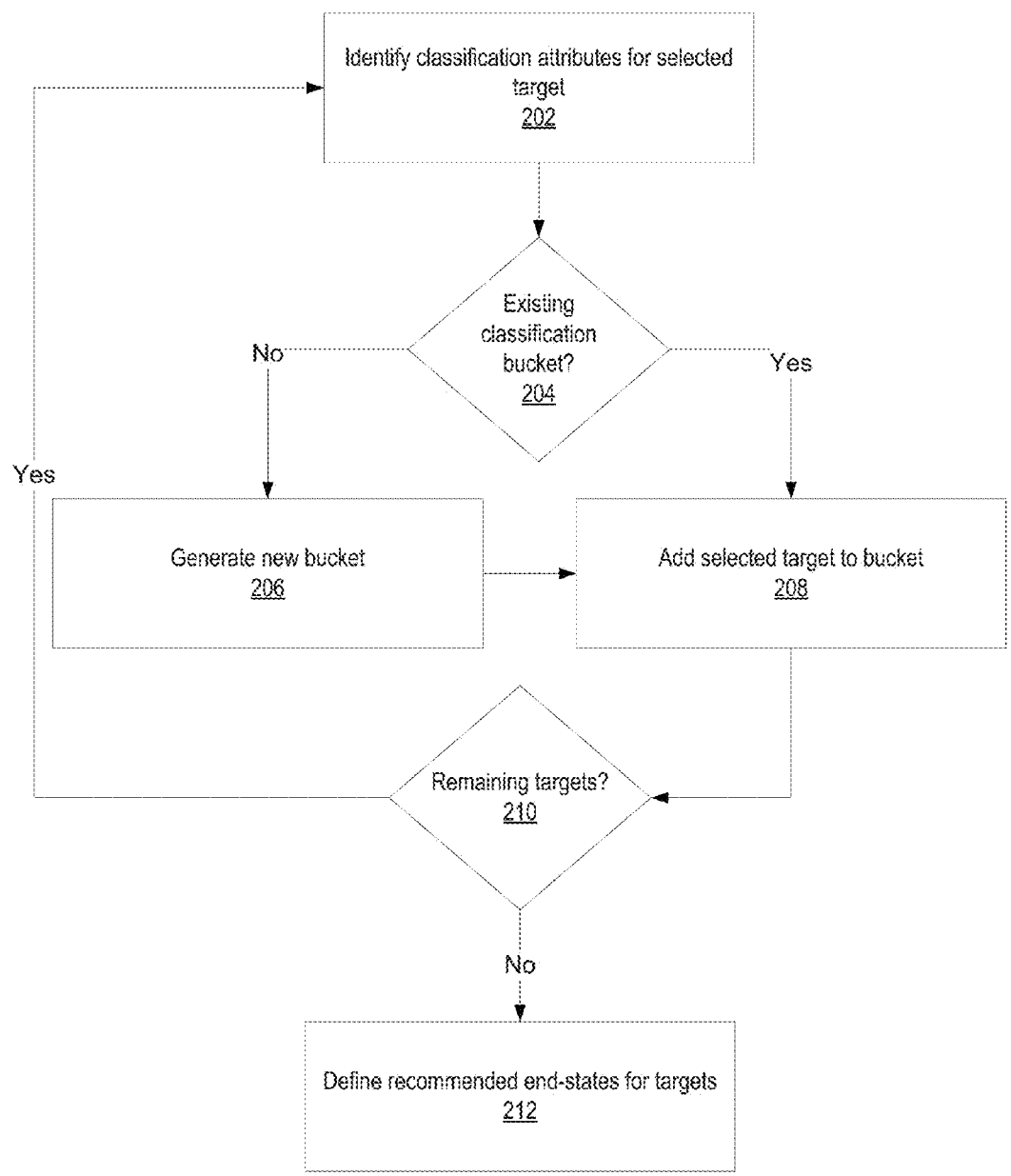
FIG. 2 illustrates an example process for mapping targets to recommended software configuration levels.

FIG. 2 illustrates an example process for mapping targets to recommended software configuration levels. The process includes grouping targets into recommendation buckets based on classification attributes as discussed further below. A "recommendation bucket" or "software configuration classification" as used in this context refers to a logical grouping of one or more targets (e.g., software deployments) that share the same classification attributes. Targets that belong to the same recommendation bucket/software configuration classification are associated with the same end point definition and recommend software configuration level.

With respect to the process depicted in FIG. 2, at step 202, image advisor 142 identifies a set of classification attributes for a selected target from targets 112a to 112n. The set of classification attributes that are used for target classification may vary from implementation to implementation. In one embodiment, the set of classification attributes identified at step 202 include the primary attributes of the selected target and zero or more secondary attributes.

At step 204, image advisor 142 analyzes the set of attributes to determine whether the selected target fits an existing recommendation bucket. A target fits a recommendation bucket if the set of classification attributes matches the classification attributes of other targets within the same recommendation bucket. For example, targets with the same target type, release version, and platform may be grouped into the same recommendation bucket, even though other attributes, such as applied patches or other secondary attributes may differ between targets in the recommendation bucket.

If the selected target does not fit a respective recommendation bucket or no recommendation buckets have been created, then at step 206, image advisor 142 generates a new recommendation bucket based on the set of classification attributes. For example, when the selected target includes a new primary attribute, image advisor 142 creates a new recommendation bucket. "New" in this context means that the primary attribute was not encountered in a previously analyzed target during the classification process.

If the selected target fits into a respective recommendation bucket or once the bucket has been created at step 206, then at step 208 image advisor 142 adds the selected target to the recommendation bucket. In some cases, a user may be permitted to define classification criteria such that a target fits into more than one recommendation bucket. In such a scenario, only one of the buckets is selected at step 208 to add the target. The selection may be made by the user or may automatically be determined by image advisor 142.

At step 210, image advisor 142 determines whether there are any remaining targets to analyze. If there is a remaining target that has not been added to a recommendation bucket, then step 202 to 208 are repeated for a newly selected target. This process may be repeated until each of targets 112a to 112n has been analyzed and classified.

Once the targets have been analyzed and classified, then at step 212 image advisor 142 defines end states for targets within the recommendation buckets. In one embodiment, image advisor 142 computes a different end-state definition for each respective recommendation bucket. Targets are then associated with the end-state definition of the recommendation bucket to which they belong. Thus, targets within the same recommendation bucket share the same end-state definition and recommended set of source components. Targets within separate recommendation buckets are associated with different end-state definitions and different recommended set of source components.

Recommendation Refinement

Image advisor 142 may allow the user to filter and segment the recommendation buckets further by specifying secondary criteria. For example, an initial analysis may group targets using only primary attributes and no secondary attributes. Thus, targets with the same primary attributes are placed in the same recommendation bucket, regardless of any differences in secondary attributes. The user may then input one or more secondary attributes filter out specific targets or adjust the groupings. In one example, an administrator may not want highly sensitive targets to be involved in the standardization process. To prevent such a scenario, the user may filter out/remove targets from the recommendation buckets based on a security-level attribute associated with the targets. As another example, a user may submit a request to further segment the recommendation buckets by location, LOB, or some other secondary attribute or combination of attributes. In response to receiving the request, image advisor 142 adjusts the recommendation buckets in accordance with the additional criteria.

Additional segment criteria may create a finer granularity amongst the recommendation buckets, resulting in a greater number of recommendation buckets and end-state definitions. As an example, a particular recommendation bucket may include ten targets. Five of the targets may be installed at a first location, and three targets may be installed at a second location, and two targets may be installed at a third location. If the user then requests further segmentation by location, then the recommendation bucket is segmented into three new recommendation buckets based on location. One of the two new recommendation buckets includes the five targets from the first location, the second recommendation bucket includes the three targets from the second location, and the third recommendation bucket includes the three targets form the third location. Each of these buckets may be further segmented based on additional criteria. This approach allows the user to adjust the parameters by which targets are grouped for standardization End State Computation For a given recommendation bucket, several possible end state definitions and corresponding set of source components may be possible. For example, a particular recommendation bucket may include targets that are configured in several different ways. In some cases, one of the targets may be configured according to an optimized configuration. In other cases, none of the targets may be optimally configured.

As discussed above, image advisor 142 may compute initial end-state definitions based on an analysis of targets 112a to 112n. To compute the end-state definition for a particular recommendation bucket, image advisor 142 may normalize the set of source components from the targets that belong to the particular recommendation bucket. Normalization may involve merging or otherwise combining different configurations of the targets into a single end state definition corresponding to a recommended standard set of source components. For example, image advisor may combine patches applied to each target within the recommendation bucket as described further herein.

After an initial end-state definition is computed at 260, the end-state definition may be further enhanced and updated. For example, image advisor 142 may check for updates or other recommended configuration information from external sources, such as a vendor support site. In one embodiment, image advisor 142 may modify the end-state definition based on:

Target-generic/tenant-generic configuration recommendations from a vendor or other service provider; and/or
Target-specific/tenant-specific configuration recommendations from a vendor or other service provider.

A "target-generic" or "tenant-generic" recommendation in the above context refers to a recommendation that applies to a particular software application regardless of where the software application is installed or the entity that controls the software deployment. As an example, a vendor may issue a global CPU or PSU to all its customers.

A "target specific" or "tenant specific" recommendation, also referred to herein as a "targeted" recommendation, refers to a recommendation that applies to a specific target or tenant. For example, a vendor may issue a custom-tailored patch update for a particular customer's environment.

Figure 3:
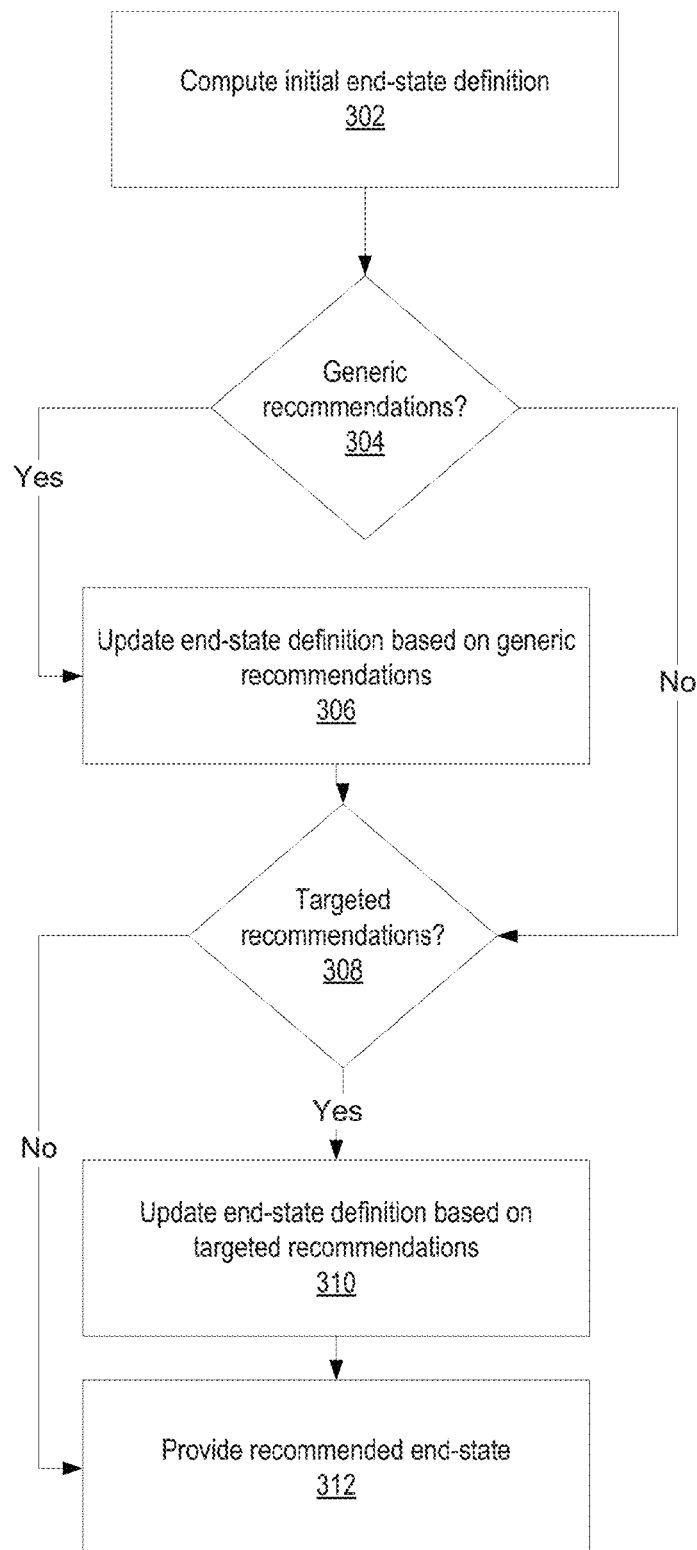
FIG. 3 illustrates an example process for computing an end state definition.

FIG. 3 illustrates an example process for computing an end state definition. At step 302, image advisor 142 computes an initial end-state definition for a particular recommendation bucket. As an example, image advisor may normalize the patch information data across targets within the recommendation bucket as described further below.

At step 304, image advisor 142 determines whether there are any target/tenant generic recommendations. Image advisor 142 may determine whether there are any generic recommendations by querying a vendor's support site or other external service for additional recommended configurations that are not included in the end state computed at step 302.

If there are additional recommended configurations, then at step 306, the end state definition is updated accordingly. If there are no additional recommended configurations or the update has completed at step 306, then the process proceeds to step 308.

At step 308, image advisor 142 determines whether are any target or tenant specific recommended configurations that were not included in the initial end state definition. In one embodiment, image advisor identifies the configurations by searching for pending service requests associated with targets in the recommendation bucket.

If there are any additional tenant or target specific recommended configurations, then at step 310, the end state definition is updated to include those configurations. If there are no additional recommended configurations or the update at step 310 is complete, then the process proceeds to step 312, and image advisor 142 provides the recommended end state for the recommendation bucket. Provide in this context may include, without limitation, sending the end state over a network, storing data identifying the recommended end state at a specified storage location, and/or causing the recommended end state to be displayed.

Patch Normalization Across Targets

As previously indicated, targets within the same recommendation bucket may have different levels of patches that have been applied. For example, one target may have applied one or more vendor-supplied patches and/or one or more custom patches that were not applied to at least one other target in the same recommendation bucket. In order to determine which patches to include in the end state definition, image advisor 142 may normalize patches across the set of targets within a given recommendation bucket.

According to one embodiment, image advisor 142 performs a union of all patches installed on targets within a recommendation bucket to normalize the patches and compute an initial end state definition. The union operation retains the unique patches that have been applied to the targets and discards redundant patches (i.e., patches that have been applied to more than one target).

In another embodiment, image advisor 142 may normalize patches based on a frequency with which the patches occur across targets within a recommendation bucket. Patches that occur above a threshold frequency may be added to the recommended end state, while patches that do not satisfy the threshold may be omitted.

Figure 4:
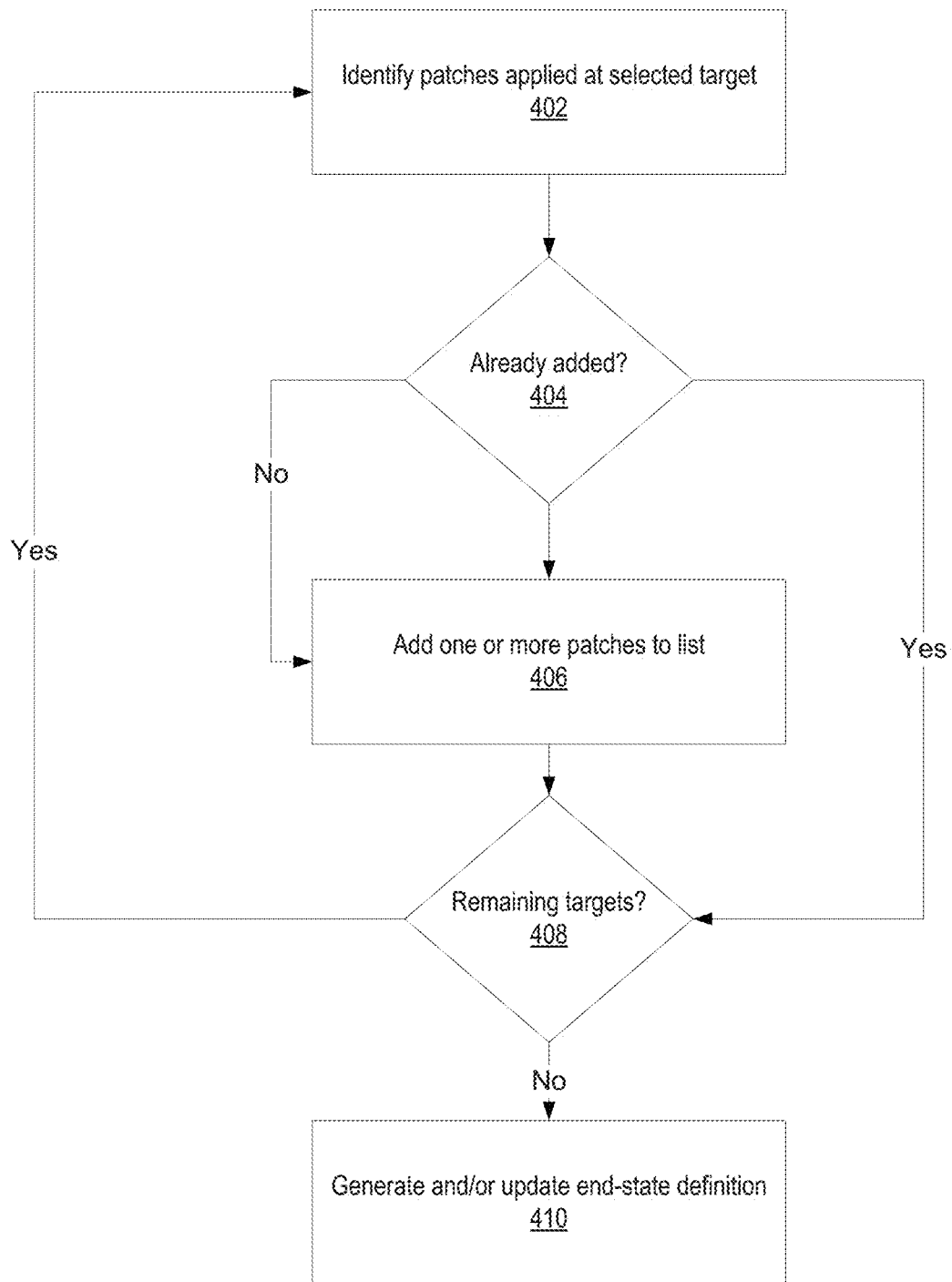
FIG. 4 illustrates an example process for normalizing patches across different targets associated with a particular recommendation bucket.

FIG. 4 illustrates an example process for normalizing patches across different targets associated with a particular recommendation bucket. At step 402, image advisor 142 analyzes a selected target to identify which patches, if any, have been applied. In one embodiment, the target properties collected by agents 114*a* to 114*n* and data collector 120 include patch description information that identifies which patches have been applied to targets 112*a* to 112*n*. Image advisor 142 may search the target properties of the selected target to determine which patches have been applied.

If one or more patches have been applied to the selected target, then, at step 404, image advisor 142 determines which of the one or more patches have already been added to a list of recommended patches associated with the end state definition. If at least one patch is not included in the list, then the process continues to step 406. Otherwise, the process proceeds to step 408.

At step 406, image advisor 142 extracts, from the target properties of the selected target, patch information for each patch that is not included in the list of recommended patches and adds the patch information to the list. In some embodiments, image advisor 142 may check an exceptions list before adding a patch to the list. For example, the exceptions list may identify incompatible or undesired patches that should not be added to the list or patches to recommend. If a particular patch is on the exception list, then image advisor 142 may proceed without adding the particular patch.

At step 408, image advisor 142 determines whether there are remaining targets within the recommendation bucket. If there is a remaining target that has not yet been analyzed, then the process repeats the remaining targets. Otherwise the process continues to step 412.

At step 410, image advisor 142 generates or updates an end state definition that includes the list of recommended patches. The end state definition is associated with the particular recommendation bucket in order to recommend a standardize patch level for targets within the bucket. The normalized patch list may be presented to a user such that the user may view and browse the list of recommended patches.

Generic and Custom Patch Recommendations

As previously indicated, image advisor 142 may modify the end state definition based on generic or targeted configuration recommendations. In one embodiment, these recommendations include recommended patch updates from vendors and/or other service providers. For example, the end-state definition may be further enhance by adding patches from:

A vendor or other service provider's patch recommendations such as CPUs or PSUs; and/or Support tickets created for the targets for which a solution has been provisioned but not yet applied.

In order to determine whether there are generic recommendations, image advisor 142 may send a request to a service provider's support site. The request may include an end state definition or other data that identifies the current recommended end state for a particular bucket of targets. In response to receiving the request, the support site may check the recommended patches against the service provider's released patches for the corresponding software product. If the support site does not identify a patch not already included in the currently recommended end state, then the support site may send a response to image advisor 142 indicating there are no additional recommendations. Otherwise, if the support site identifies a patch that is not included in the currently recommended end state, then the support site may send a response to image advisor 142 that includes the patch or indicates a location where the patch may be downloaded. Image advisor 142 may then update the end state definition with information identifying the service provider's recommended patches.

In one example, image advisor 142 may search for pending support tickets for targets within a recommendation bucket. A "support ticket" in this context refers to data item that identifies a service request from a customer or other user to a service provider. For example, the support ticket may comprise a request to correct a particular error or provide a particular enhancement for a particular software application. A support ticket is said to be pending if the service request has not been resolved or if a resolution has not yet been applied to the target(s) for which the service request pertains. If image advisor 142 detects a support ticket for one of the targets that is still pending, image advisor 142 may send a status request to the service provider's support site. If the support site determines that the service request is resolved, then the support site may send a response to image advisor 142 that includes the patch or indicates a location where the patch may be downloaded. Image advisor 142 may then update the end state definition with information identifying the service provider's recommended patches.

Gold Image Creation

The end-state definition is the logical definition of a set of software source components. For example, the end-state definition may define the set of source components as a base software version plus that recommend patches to apply on top of it. A physical software binary component that represents the end-state is herein referred to as a "gold image". The term "gold" is a qualifier signifying an optimal or recommended standard or level for the software configuration. The gold image may be used to install software that includes the recommended set of source components.

In one embodiment, image creator 144 includes logic for creating a gold image based on an end-state definition. In order to create the gold image, image creator 144 determines the configuration-level of the software as defined by the end-state definition. For example, image creator 144 may determine the base version of the software plus which patches are recommended. Image creator 144 then generates a gold image comprising the binary payload or other machine-readable code that includes the source components identified by the end-state definition.

Figure 5:
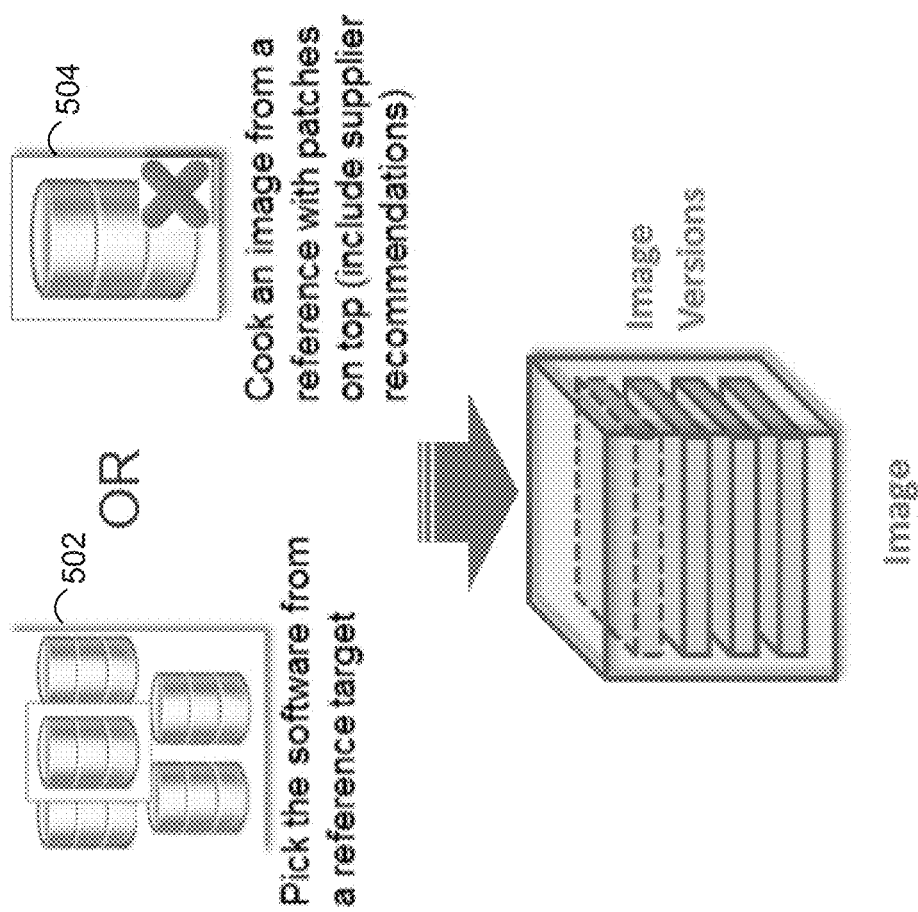
FIG. 5 illustrates different methods that may be used to create a gold image.

The manner in which image creator 144 generates the payload data for the gold image may vary from implementation to implementation. For example, FIG. 5 illustrates different methods that may be used to create a gold image. In scenario 502, image creator picks the software from a reference target. For example, one or more targets within a particular recommendation bucket may already include the recommended set of source components. In such a scenario, image advisor 144 may assign one of these targets to act as the gold image or may copy the binary payload to another location. In scenario 504, image creator "cooks" a gold image from a reference with patches on top. For example, if there are additional patches identified as recommended, image creator 144 may deploy a base version of the software application on a test target, and then apply the recommended patches.

Once the gold image is created, image advisor 142 maps the gold image to the recommendation buckets and associated targets for which the gold image was created. Thus, each recommendation bucket and the targets therein are associated with a particular end state definition that defines a recommended set of source components and a gold image that comprises the physical payload of the software that includes the recommended set of source components.

End State and Gold Image Updates

The optimal configuration level for targets may change over time. For example, plug-ins, bug fixes, or other patches may be periodically released by the vendor of a software application. In order to account for such updates, the end state definition and gold image for a particular bucket of targets may change over time.

In one embodiment, a base version of an end state definition and gold image is initially created by standardization management logic 140. After the base version is created, patches that are released are introduced at the end-state definition level, and image creator 144 may create a new version of the gold image.

Figure 6:
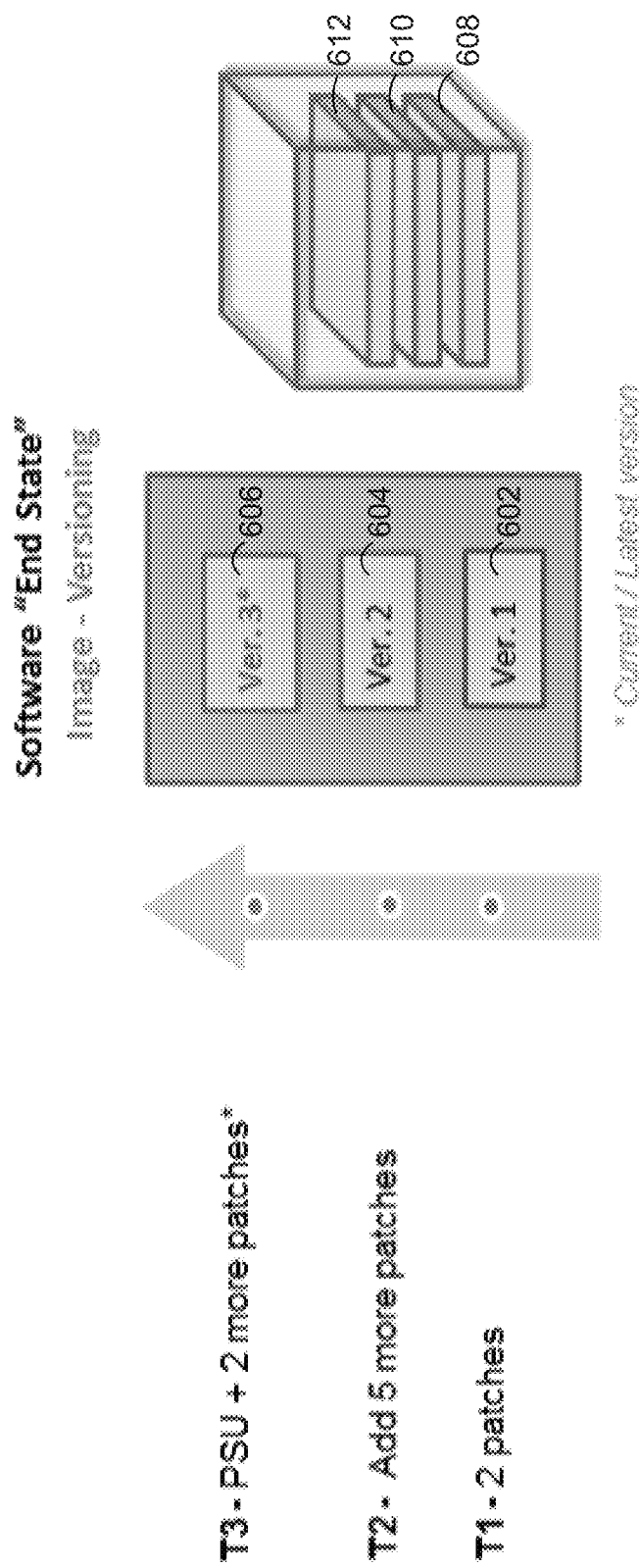
FIG. 6 illustrates updates to an end state definition and corresponding gold image as patches are released over time.

FIG. 6 illustrates updates to an end state definition and corresponding gold image as patches are released over time. Version 602 represents the base version of an end-state definition that was created at time T1. The base version of the end-state definition corresponds to the base version of a software application plus two patches applied on top. Image 608 is the gold image that matches the configuration level defined by version 602. At time T2, five more patches for the software application are released. Version 604 of the end state definition is created by updating version 602 to include the additional patches, and image 610 is created by applying the additional patches to image 608. At time T3, a PSU plus two more patches are released. Version 606 of the end state definition is created by adding the PSU and two additional patches to version 604 of the end state definition, and image 612 is created by applying the PSU and two additional patches to image 610. At time T3, version 606 represents the current/latest version of the end-state definition, and image 612 represents the current/latest version of the gold image.

Figure 7:
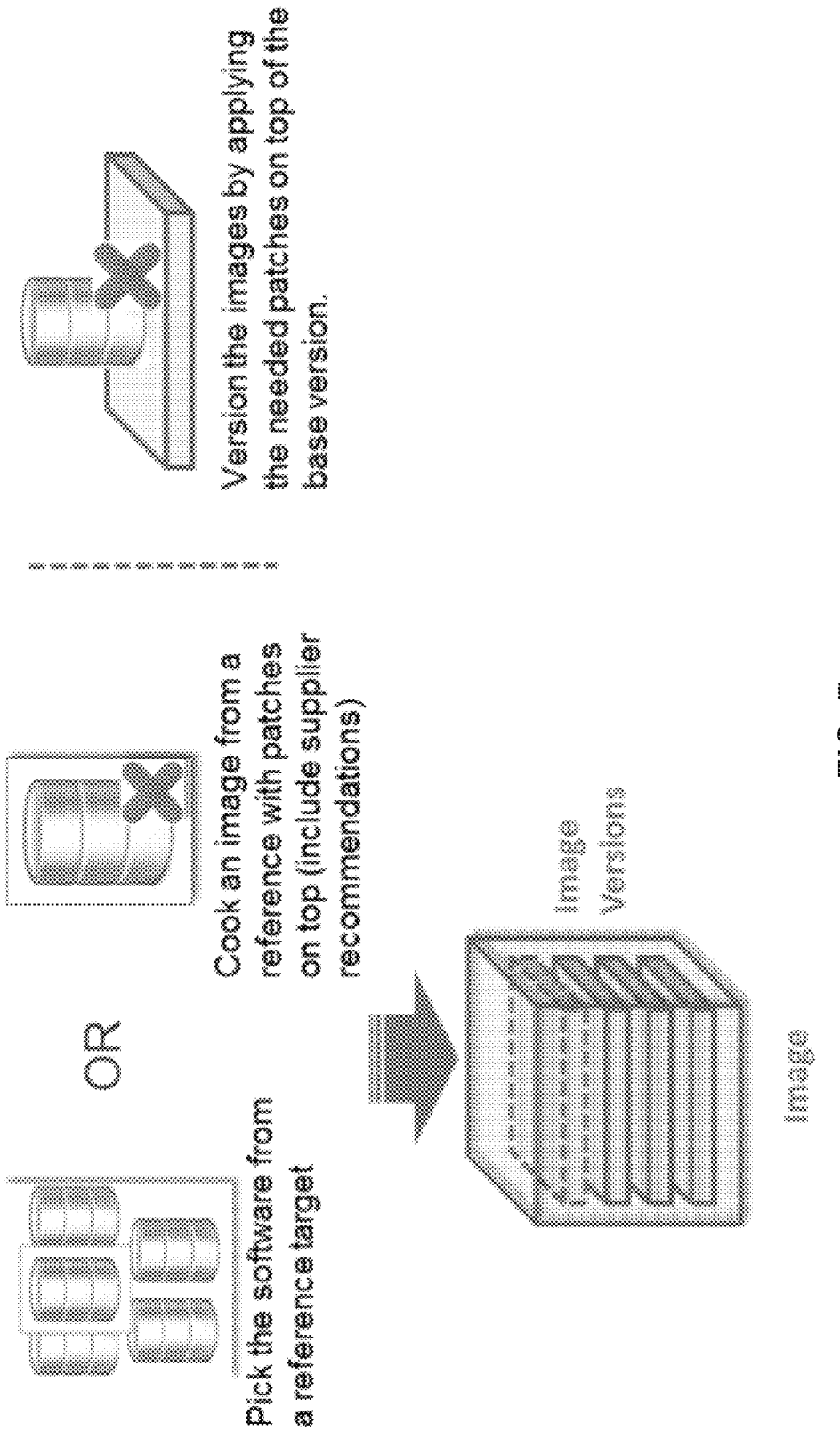
FIG. 7 illustrates the creation of a base and subsequent versions of a gold image.

FIG. 7 illustrates the creation of a base version and subsequent versions of a gold image. As previously discussed, the base version of an image may be pulled directly from a reference target or by cooking the image from a reference with patches on top. New image versions are created by applying newly acquired patches on top of the base version.

Flocking Groups

In order to standardize the set of source components for targets within a recommendation bucket, the targets may subscribe to a gold image. A group of targets that subscribe to the same gold image are herein referred to as a "flocking group". The gold image acts as the lead for the flocking group. As the gold image is being revised for changes, the subscribed targets follow the gold image to keep up with the latest versions.

Figure 8:
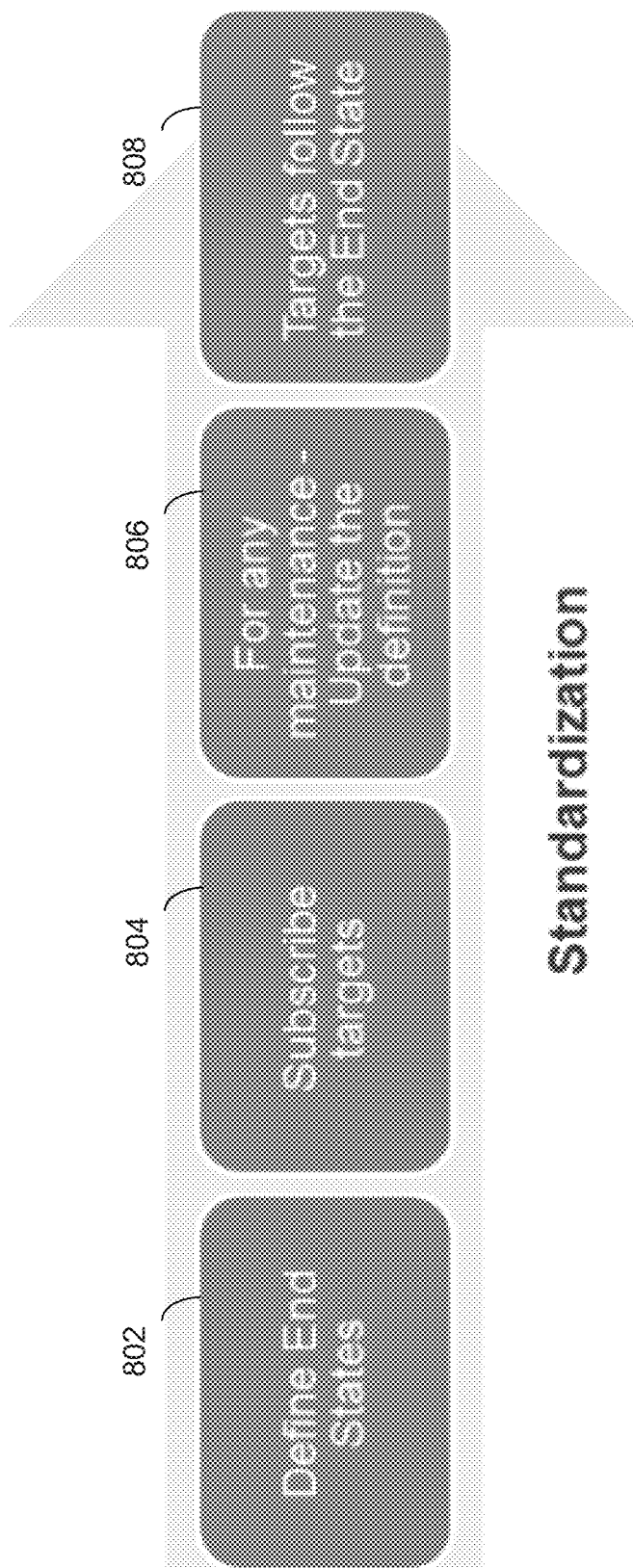
FIG. 8 illustrates an example process for maintaining standards across a plurality of targets.

FIG. 8 illustrates an example process for maintaining standards across a plurality of targets. At 802, a set of one or more end states are defined. Defining the end states may comprise analyzing targets 112a to 112n and grouping the targets into recommendation buckets as described above.

At 804, the targets are subscribed to a particular end state definition and corresponding gold image. In one embodiment, each recommendation bucket is subscribed to a single end state definition and a single gold image. Thus, the targets within the same recommendation bucket form a flocking group. Group manager 146 may maintain subscription data that maps targets within a flocking group to a particular end state definition.

At 806, the end state definition is updated. For example, a service provider may release CPUs or PSUs for a particular software application that is associated with the end state definition. These patches may then be added to the end state definition, and the corresponding gold image may be updated.

At 808, the targets that are subscribed to the end state definition follow the end state definition. For example, newly released upgrades or other patches are applied to each of the targets within the same flocking group. Thus, changes to a gold image are propagated to subscribed targets, facilitating updates in large-scale environments and maintaining a standardized configuration across different software deployments.

Figure 9:
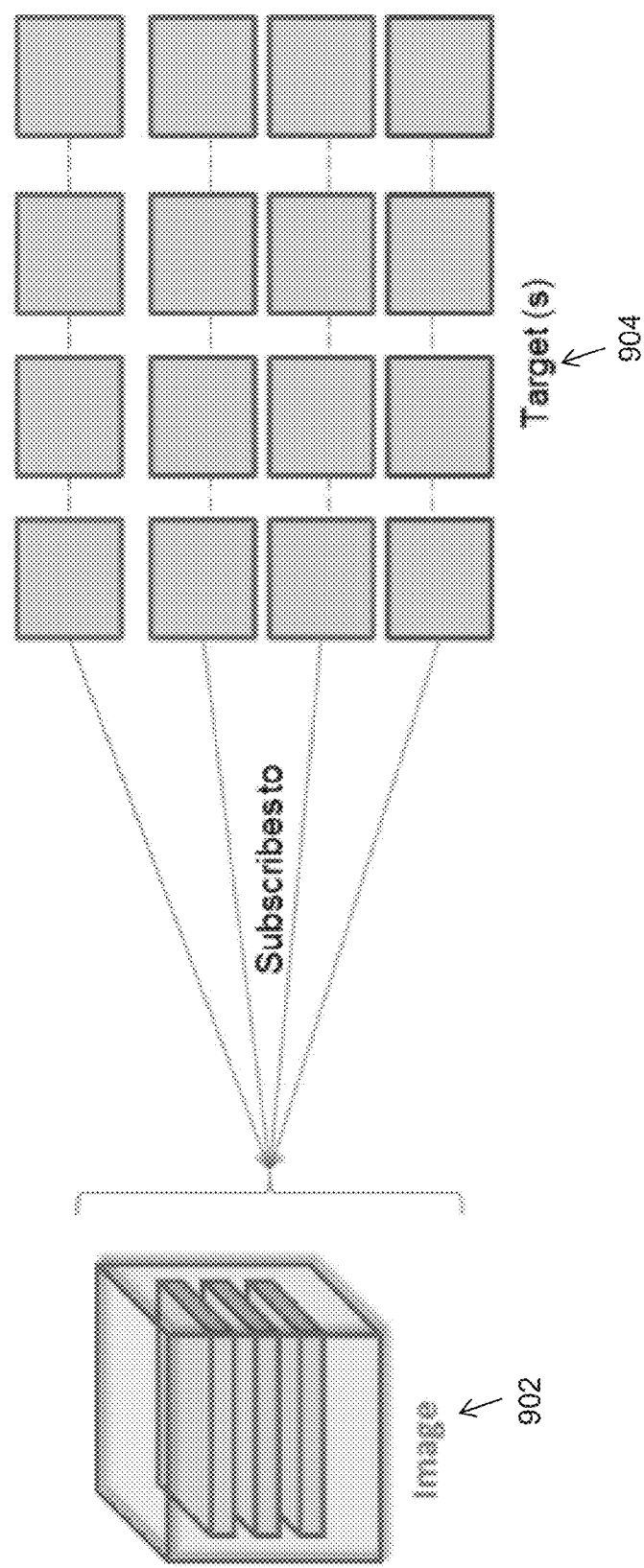
FIG. 9 illustrates targets that subscribe to an image and follow the updates to the latest versions available

FIG. 9 illustrates targets that subscribe to an image and follow the updates to the latest versions available. Image 902 represents the end state definition for a particular release version of a software application that runs on a particular platform. Image 902 includes multiple versions of a gold image. Target(s) 904 represent one or more targets that are subscribed to image 902. As image 902 is updated, target(s) 904 follow the image such that the configuration of the targets matches the configuration of image 902. Patches that are applied to image 902 are also propagated to each of target(s) 904.

Multi-Image Management

In some cases, more than one gold image may be maintained for targets 112a to 112n. For example, image advisor 142 may recommend different end state definitions for different software configuration classifications as described above. Image creator 144 may generate a different gold image to represent each respective end state definition. Group manager 146 may then automatically subscribe each respective target to an image based on the respective target's software configuration classification. In addition or alternatively, an administrator or other user may manually select targets or groups of targets to be subscribed to an image.

Figure 10:
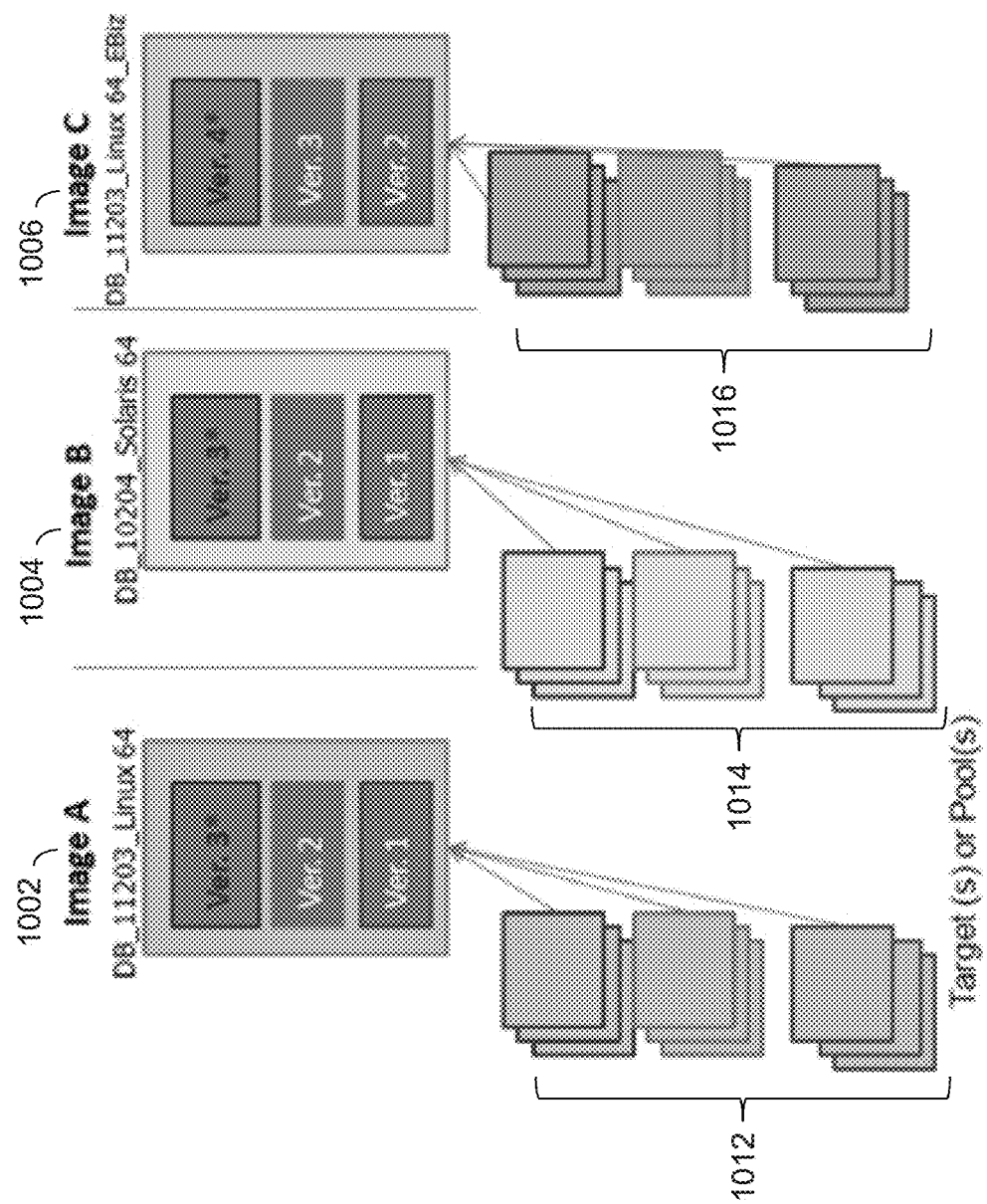
FIG. 10 illustrates an example datacenter environment where multiple gold images are maintained.

FIG. 10 illustrates an example datacenter environment where multiple gold images are maintained. Image 1002 represents a gold image for a first software configuration classification, image 1004 represents a gold image for a second software configuration classification, and image 1006 represents a gold image for third software configuration classification. Target(s) 1012 comprise one or more targets that fit the first software configuration classification and are subscribed to gold image 1002, target(s) 1014 comprise one or more targets that fit the second software configuration classification and are subscribed to gold image 1004, and target(s) 1016 comprise one or more targets that fit the third software configuration classification and are subscribed to gold image 1006.

When there are multiple gold images, targets follow the image to which they are subscribed but do not follow other gold images. For example, if image 1002 is updated, a new version of the gold image is created. Target(s) 1012 may then apply the updates to follow the new version of the gold image. However, target(s) 1014 and 1016 do not apply the updates as they do not subscribe to image 1002. Similarly, updates to image 1004 are applied to target(s) 1014, but not target(s) 1012 and 1016, and updates to image 1006 are applied to target(s) 1016, but not target(s) 1012 and 1014.

Signature Generation

In one embodiment, signature generator 148 generates a software configuration level signature from digest information associated with a target or gold image version. "Digest information", in this context, refers to data that identifies a set of source components. For example, the digest information may comprise an ordered set of attributes that describe or otherwise identify characteristics of a respective target. Any item that is included in the digest or any item that modifies a software installation may be considered a source component.

Signature generator 148 may extract the digest information by mining and collating a set of target properties, such as those described above, that identify the source components of the target. Generally, the attributes that are mined and used to generate the signature comprise attributes that identifies a software system's base version and the patches that have been applied to the software.

The order in which the attributes are collated may vary from implementation to implementation. In one embodiment, signature generator 148 starts with attributes that apply to the outermost shell of a target. Signature generator 148 then works inward to collate properties that apply to elements, sub-elements, etc. As an example, signature generator may create a string that begins with primary attributes describing the outer shell (e.g., the primary attributes), followed by attributes identifying target components that are part of the target and within the outer shell (e.g., plugins or other applications), followed by attributes identifying sub-components applied to each of the components (e.g., patches).

In one embodiment, the signature is a hash value obtained by applying a hash function to the digest information. When applying the hash function, the digest information serves as the hash key that is input into the hash function. In response to receiving the digest information, the hash function maps the digest information to a hash value that may be used to uniquely identify the software source components described in the digest information. The hash function that is applied to the digest information may vary from implementation to implementation. Examples may include, without limitation, cryptographic hash functions and non-cryptographic hash functions.

Signature Mappings

In one embodiment, signature generator 148 maintains signature-to-digest mappings that map signatures to corresponding digest information. For example, signature generator 148 may maintain the mappings within a hash table or other data structure. Thus, given a particular signature, the corresponding software configuration level may be determined and extracted from the signature-to-digest mappings. Furthermore, individual attributes or groups of attributes that are included in the digest information may be determined and extracted. For instance, the target type, release version, platform, and/or patches may be determined and extracted for a given signature.

Figure 11:
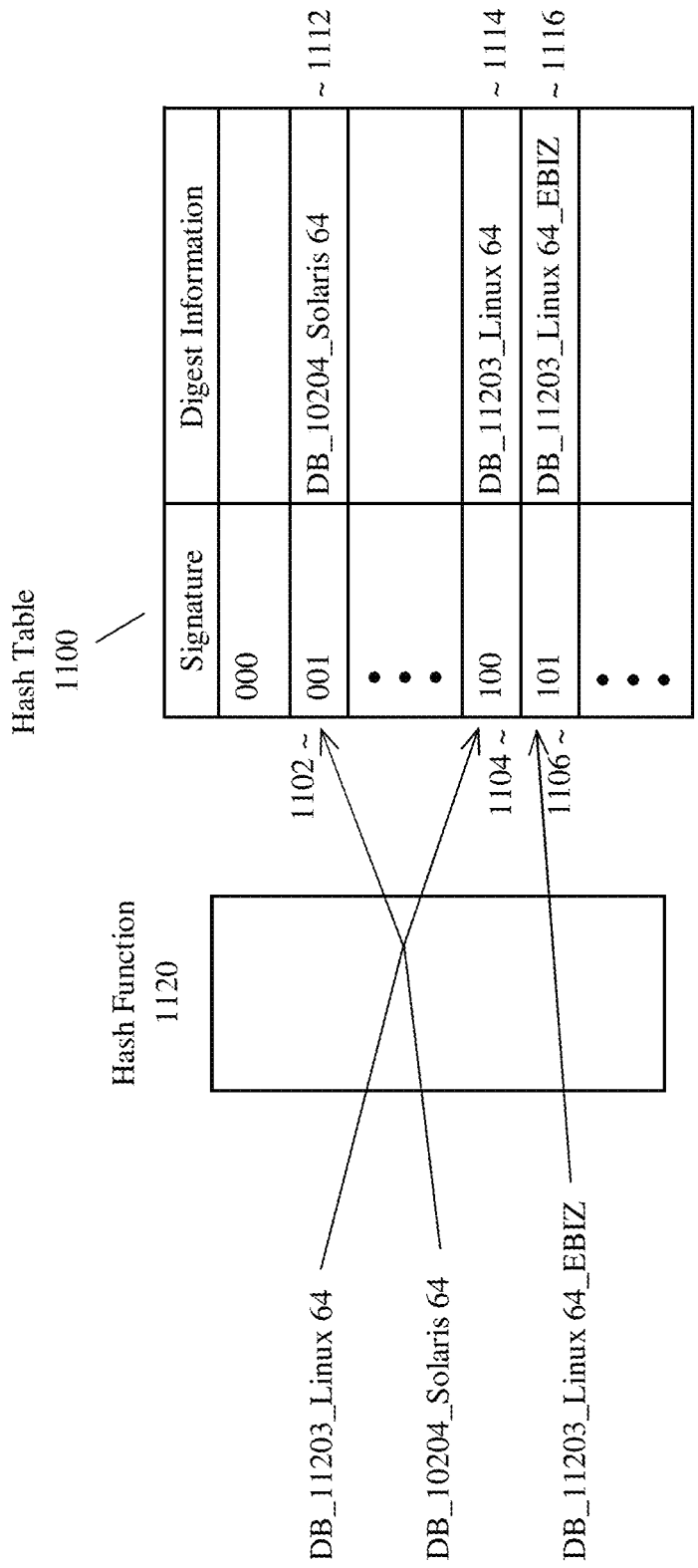
FIG. 11 illustrates an example hash table that maps signatures to corresponding software configuration descriptions.

FIG. 11 illustrates an example hash table that maps signatures to corresponding software configuration descriptions. With reference to hash table 1100, hash value 1102 maps to entry 1112 in the hash table, which stores digest information describing a first software configuration. Similarly, hash values 1104 and 1106 map to entries 1114 and 1116, respectively, which store the corresponding digest information. The hash values are obtained by applying hash function 1120 to the digest information for each respective target.

Signature Tagging of Gold Images

In one embodiment, signature generator 148 includes logic for generating signatures for gold images. A plurality of signatures may be generated for a single gold image to distinguish between different versions of the gold images. For example, when a new version of a gold image is created, signature generator 148 may apply a hash function to the end state definition to generate a configuration level signature. Signature generator 148 may map the resulting signature to the new image version and corresponding end state definition. This process may continue each time a new version is generated, resulting in signature tagging of each image version.

Figure 12:
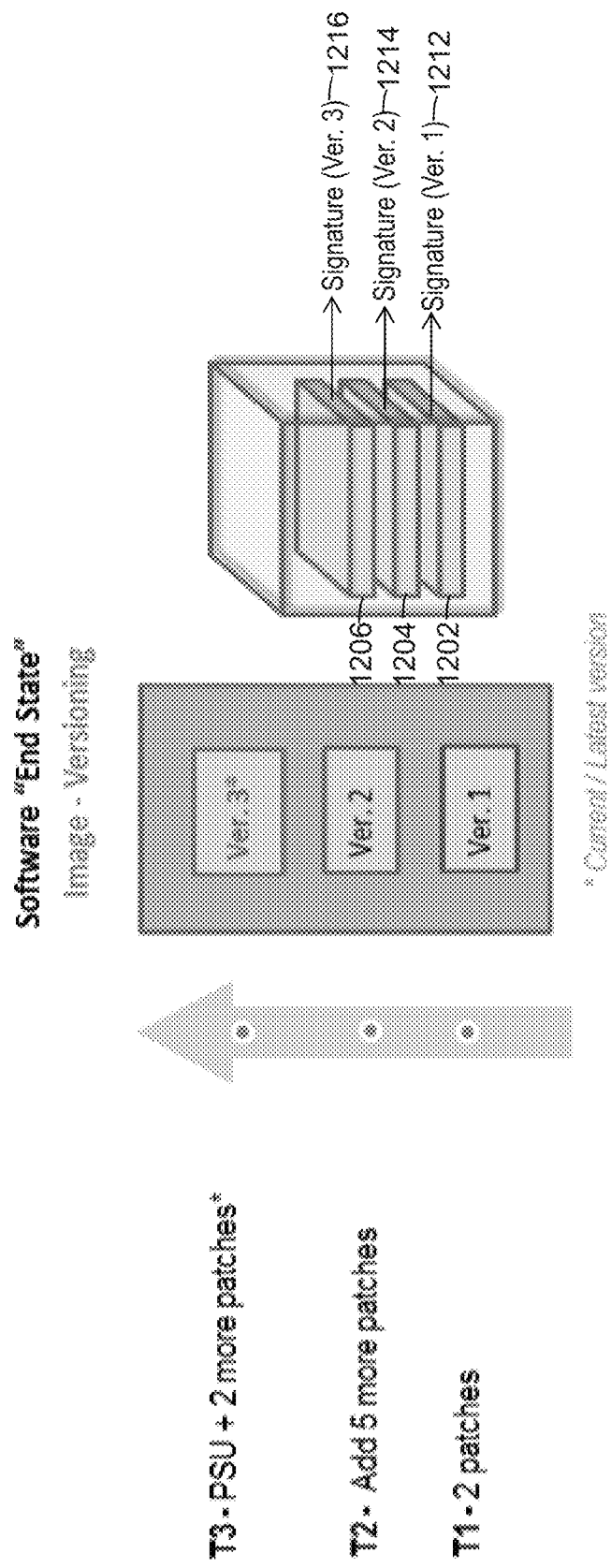
FIG. 12 illustrates an example gold image that has been tagged with a plurality of signatures.

FIG. 12 illustrates an example gold image that has been tagged with a plurality of signatures. At a first point in time, version 1202 of gold image 1200 is created by image creator 144. Version 1202 includes two patches applied to a base version of a software system. When the image is created, signature generator 148, may apply a hash function to digest information (e.g., the end state definition) associated with version 1202 to generate signature 1212. Signature generator 148 then stores a mapping between version 1202 and signature 1212. Signature 1212 may also be mapped to the digest information describing or otherwise indicating the source components of image version 1202.

At a second point in time, five more patches may be added to gold image 1200 to create version 1204. Signature generator 148 may apply a hash function to the updated digest information associated with version 1204 to generate signature 1214. Signature generator 148 maps signature 1214 to image version 1204 and the corresponding digest information.

Signature generator 148 may continue this process for each new version of a gold image. Thus, signature 1216 is mapped to version 1206 and its corresponding digest information. Because of the different patch levels between the different image versions, signature generator 148 generates a distinct signature for each version that uniquely identifies the corresponding source components of the respective image version. The signatures may be used to determine which version of an image a member of a flocking group follows, as described further below.

Signature Management for Targets

In one embodiment, signature generator 148 includes logic for generating and storing configuration level signatures for targets 112a to 112n. For example, signature generator 148 may apply a hash function to digest information for each respective target, as described above, to generate and map a signature representative of the configuration level of the respective target. The hash value/configuration level signature may be stored at the target as parts of the target's properties and/or may be stored as part of collected information in repository 130.

Signature generator 148 may generate signatures periodically or in an on-demand basis, depending on the particular implementation. As an example, agents 114a to 114n may periodically collect and send target properties to data collector 120. Upon receipt, signature generator 148 may generate the configuration level signature from the target properties and store the signature as a target property in repository 130. Thus, the configuration level signature for each target may be updated and stored on a periodic basis. In another example, signature generator 148 may generate a signature whenever a patch is applied to one of targets 112a to 112n.

Signature-Based Compliance Queries

In one embodiment, signature generator 148 includes logic for identifying targets that comply with an image version. During the compliance checks, signature generator 148 compares the signature generated for the image against signatures generated for the targets. This technique allows for quick computation of compliance, avoiding complex comparisons between a potentially large number of attributes involved in defining a configuration level.

Figure 13:
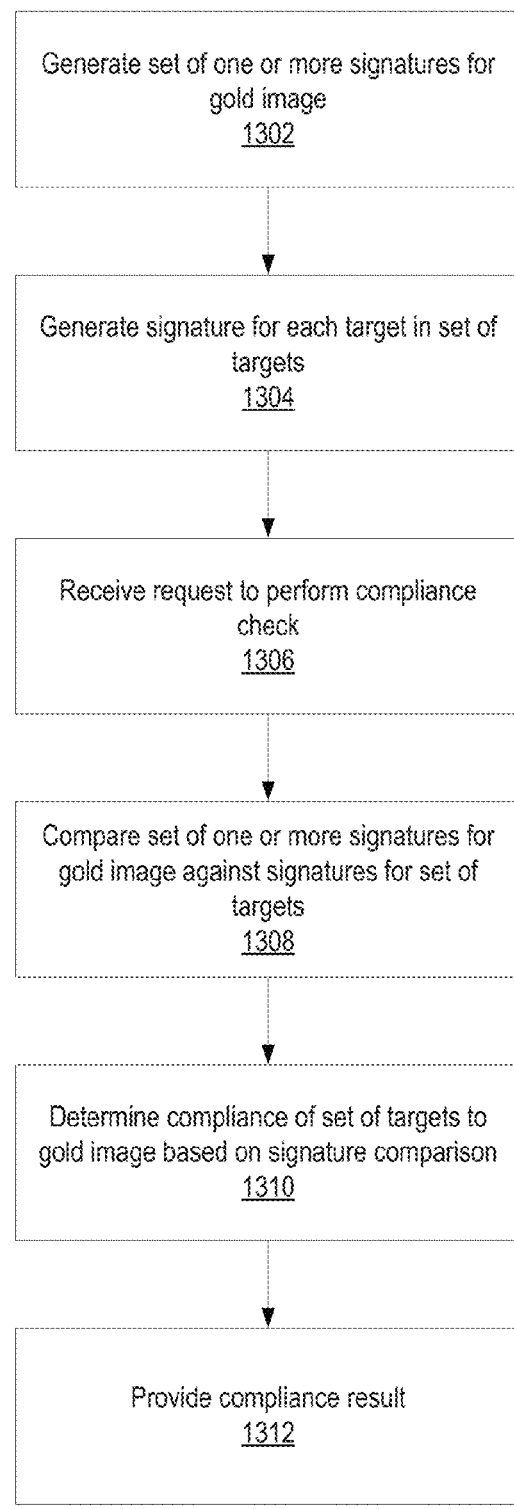
FIG. 13 illustrates an example process for performing compliance checks using software configuration level signatures.

FIG. 13 illustrates an example process for performing compliance checks using software configuration level signatures. At step 1302, a set of one or more signatures are generated for a particular gold image. The set of signatures may include multiple signatures for different versions of the gold image. Each respective signature in the set of signatures may be generated based on the end state definition of a corresponding image version as described above.

At step 1304, a signature is generated for each target in a set of targets. In one embodiment, the set of targets are part of a flocking group that follows the gold image. Each signature may be generated based on the target properties of a respective target, as described above.

At step 1306, a request to check a compliance of the set of targets with the particular gold image is received. The compliance request may be issued to determine how many targets are currently complying with the gold image and/or to determine which version of a gold image each of the targets are following, if any.

In response to the compliance request, at step 1308, the set of one or more signatures for the particular gold image is compared to the signature generated for each target in the set of targets.

At step 1310, the compliance of the set of targets is determined based on the signature comparisons. If the signatures between the signature for a target and the signature for an image version match, then the target is following that image version and may be determined to be compliant. If there are no matches for a particular target, then the targets may be determined to be non-compliant.

At step 1312, a compliance result is provided to a user. For example, the compliance result may indicate what percentage of targets within the set of targets are following the gold image and how many total targets are following the gold image. The compliance result may further indicate image-specific information, such as how many targets are following each different image. The user may further be notified of any drifters as described further below. Thus, the configuration level signatures may be used to quickly determine the state of compliance and update progress for targets that are subscribed to a gold image.

Image Lifecyle Overview

A gold image and its associated version may undergo different states during its life as its being used to update subscribed targets. For example, when a new version of a gold image is first released, it may take time to move subscribed targets to the new version. Targets may delay switching to the new version to avoid service interruptions caused by applying the updates or for other reasons. In order to support such targets, the old version of an image may remain active even though it is not the latest version of a gold image. Once there are no subscribed targets that are on an old image version, that version of the image may be retired. In another example, a new version of a gold image may undergo a testing phase before being published to the subscribed targets.

Example life cycle states for a gold image and its version may include, without limitation:

Draft: An initial state for an image version. The image version may remain in this state from the creation to a testing phase for the image version.

Active: Restricted: A state for a beta release of an image for performing trials with a subset of targets rather than the entire set of subscribed targets.

Active: Current: A state for the latest version of an image that is public. Public in this context means that the version is available to all subscribed targets (e.g., not in a draft or restricted state).

Active: A state for old versions of images that have not been retired.

Retired: An end of life state for an image version. When there are no subscribed targets the image version may be retired from active usage.

Test Phase for Updated Images

As indicated above, a new version of a gold image may be tested before being published to all subscribed images. During the test phase, a subset of one or more of the targets subscribed to the gold image or some other set of test targets may be updated with the new version of the gold image. The testing phase gives the administrator a chance analyze the new image version on test targets to identify potential problems or other issues before the new version is rolled out to production targets. If a problem is encountered, the administrator may attempt to resolve the issue or rollback the new version of the gold image to a previous version.

In one embodiment, group manager 146 maintains a list of test targets for each flocking group. When an update to a gold image is received, group manager 146 releases the update to the test targets on the list, but not to other members of the flocking group. An administrator or other user may create and modify the list to specify which of the targets to use as test targets.

State Transitions for Image Versions

Figure 14:
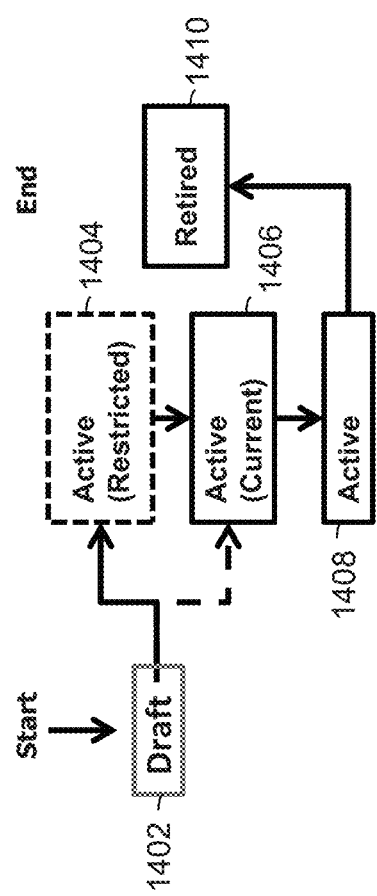
FIG. 14 illustrates a transition between different states for versions of a gold image.

FIG. 14 illustrates a transition between different states for a version of a gold image. A new version of a gold image (either the base version or a successive one) starts in the draft state 1402. In this state, the payload for the new version has been created, but has not become active and used to update subscribed targets.

From draft state 1402, the image version may be promoted (e.g., by an administrator or other user) to active usage either in active restricted state 1404 or active current state 1406. If the image version is promoted to active restricted state 1404, the image version is released to a set of restricted test targets for beta testing as described above. Once testing is complete, the image version may be promoted to active current state 1406.

While in active current state 1406, the new version of the image is published to all subscribed targets. "Published" in this context means that the image is available for all subscribed targets to be used in the update process. In some cases, a notification may be sent to one or more of the subscribed targets to indicate that a new version of the image is available. The subscribed targets may then begin the process of updating to the new version of the image. The image version remains in active current state 1406 until a newer image version is promoted to this state. When the newer image version is promoted to active current state 1406, the predecessor is pushed to active state 1408.

While in active state 1410, an image version may support one or more followers that have not moved to the most current version of the gold image. For example, a subscribed target may delay updating to the new version of a gold image until a later date. Once there are no longer any targets subscribed to the image that follow a particular version, that version may transition from active state 1410 to retired state 1412.

When an image version is in retired state 1412, all subscribed targets have been updated to a subsequent version of the gold image, and no targets follow the retired version. Older versions of a gold image that are in retired state 1412 may be archived or deleted.

Figure 15:
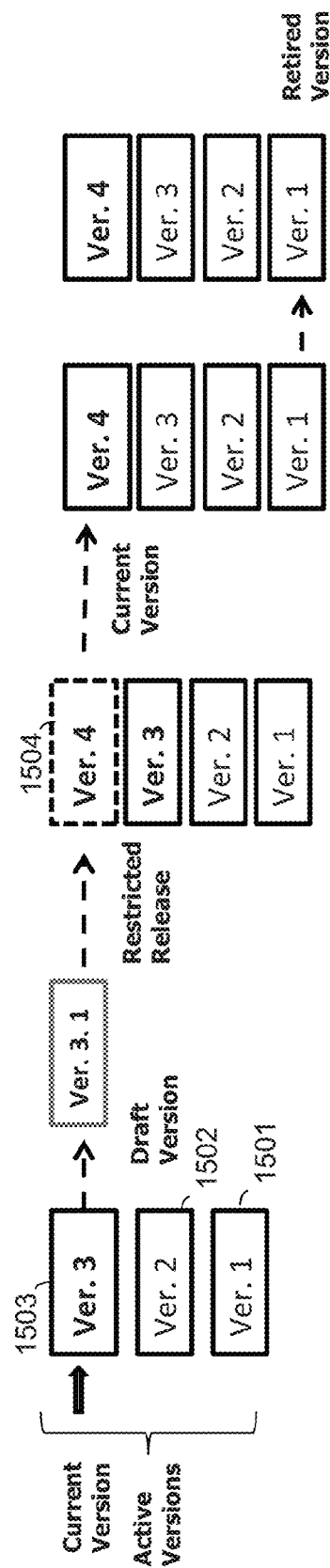
FIG. 15 illustrates the cycle that occurs within a gold image during creation of a new image version.

FIG. 15 illustrates the cycle that occurs within a gold image during creation of a new image version. At the outset, there are three active versions of the gold image: version 1501, 1502, and 1503. Upon creation, version 1504 starts as a draft version. Version 1504 is then promoted to a restricted state. While in the restricted state, image versions 1501, 1502, and 1503 remain active. Version 1504 may then be promoted to the current version of the gold image. Upon promotion, version 1503 is pushed from the active current state to an active state. At a later point in time, all targets following version 1501 may be updated to a subsequent version of the gold image. Thus, version 1501 transitions to a retired state.

Rogue Targets

In some cases, a target that is part of a flocking group may drift from the flocking group. A target is said to drift from the flock when a patch is applied, omitted, or removed in a manner that does not follow the gold image. In some scenarios, for instance, targets may be patched on an ad-hoc or emergency basis to address issues that arise, even though the applied patches are not included in a gold image's end-state definition. In other scenarios, patches may be rolled back or lost. A target which is patched outside a gold image's end-state definition is herein referred to as a "rogue" target. A patch that is outside the gold image's end-state definition is herein referred to as a "drift" patch.

Rogue targets may be classified into different categories. First, a rogue target may have additional patches that are not included in the current version of a gold image. Second, a rogue target may have fewer patches than the current version of a gold image. Drift manager 152 may manage rogue targets based on their classification, as described in further detail below.

In some embodiments, targets that have additional or fewer patches than the current version of a gold image but are following other active versions of a gold image are not classified as rogue. For example, a particular target may be following a target that is in an active restricted state or active but not current state. Targets following such versions may be deemed to be in compliance with the gold image standard since these versions of the gold image have not been retired.

Rogue Identification

In one embodiment, drift manager 152 includes logic for identifying and classifying rogue targets. To identify rogue targets, drift manager 152 may compare the software configuration level signatures for active versions of a gold image against software configuration level signatures of subscribed targets. If no match is detected, then a subscribed target may be classified as a rogue. Drift manager 152 may further classify the rogue target based on whether drift patches have been applied or whether the rogue target is missing patches that belong to the current active version of the gold image.

Figure 16:
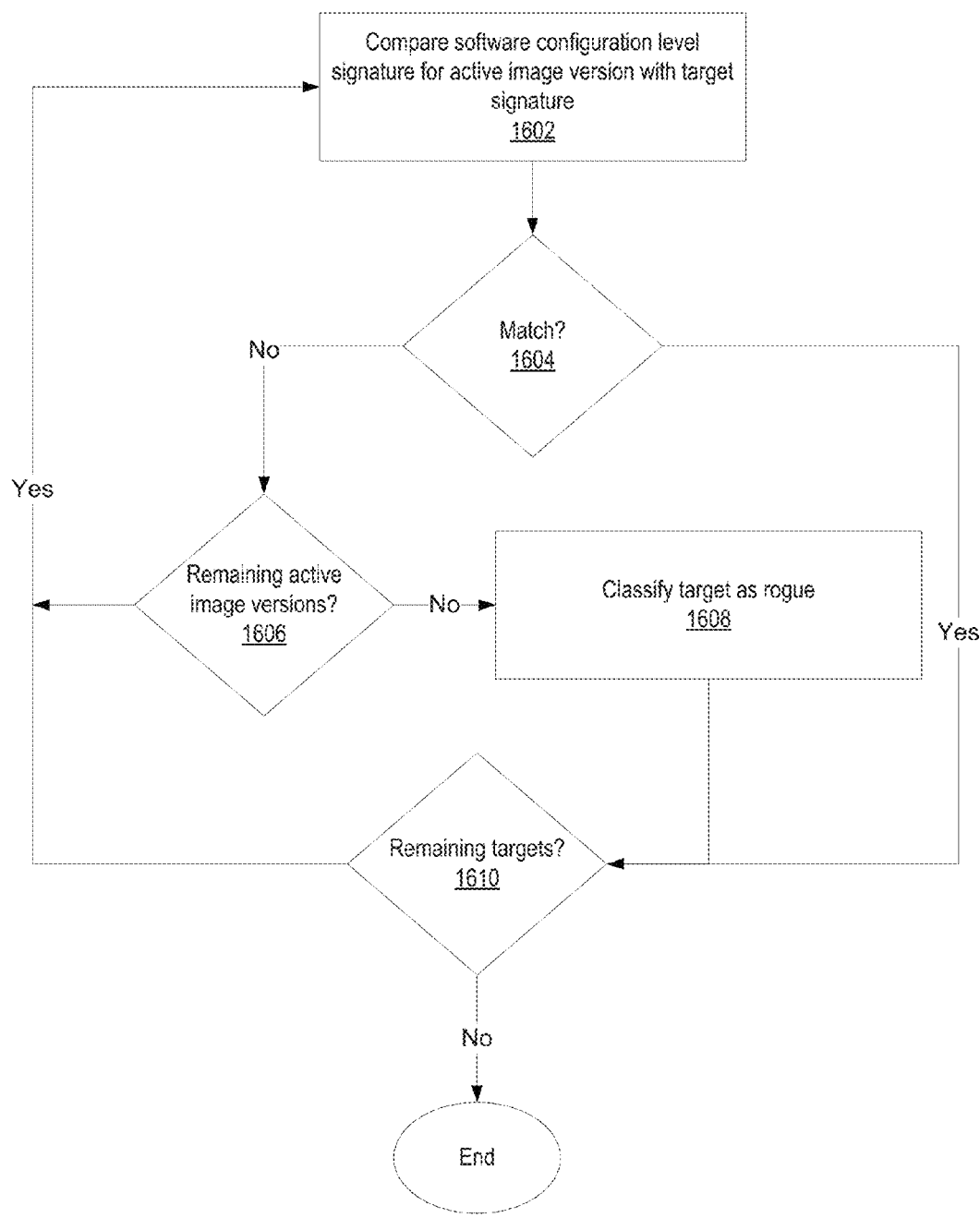
FIG. 16 illustrates an example process for identifying rogue targets within a flocking group.

FIG. 16 illustrates an example process for identifying rogue targets within a flocking group. At step 1602, drift manager 152 compares a software configuration level signature for an active version of a gold image with a software configuration level signature for a subscribed target.

At step 1604, drift manager determines whether the configuration level signatures match. If the signatures match, then the subscribed target is not a rogue, and the process continues to step 1610. If the signatures do not match, then, at step 1606, drift manager 152 determines whether there are remaining active versions of a gold image.

If, at step 1606, it is determined that there is a remaining active version that has subscribed target has not been checked against, then the process returns to step 1602 to compare the configuration level signature for the remaining active version with the configuration level signature of the rogue target. If all remaining active versions have been analyzed and there is still no match, then the process continues to step 1608, and the target is classified as a rogue.

At step 1610, drift manager 152 determines whether there are any remaining subscribed targets in the flocking group that have not been analyzed. If so, then the process repeats for the remaining subscribed targets. Otherwise, the process ends.

Drift Control

In one embodiment, drift manager 152 includes logic for controlling drift within the flocking groups. If an update causes a subscribed target to drift and become rogue, then drift manager 152 may prevent the out of band update until it has gone through proper change management approvals. For example, a user may request or otherwise attempt to apply a patch to a subscribed target. Drift manager 152 may intercept the update and determine whether it complies with the end state definition. If the update would cause the target to drift, then drift manager 152 may prevent the update and notify a datacenter manager or other administrator. The administrator may then choose to allow the update and the target to drift or to block the update, maintaining the standards represented by the gold image.

Drift Notification

In one embodiment, drift manager 152 includes logic for displaying and storing notifications and/or other indications when a target drifts. The notifications may indicate in what way the target has drifted from a flocking group. For example, the notification may indicate whether the target has too many patches, too few patches, or whether an incompatible patch exists. If a target has one or more additional drift patches, drift manager 152 may provide patch information identifying the drift patches applied at the rogue target. If the target is missing one or more patches, then the notification may identify which patches the target is lacking.

For a given flocking group, drift manager 152 may present compliance information to a user. The compliance information may display how many targets in the flocking group have drifted. The compliance information may further present target information for the rogue target, allowing the user to pinpoint exactly which target(s) have drifted from the flocking group. The user may drill down to a particular target to identify the patches (or lack of patches) that cause the target(s) to drift.

Rogue Reconciliation

In one embodiment, drift manager 152 includes logic for reconciling rogue targets. The process of reconciliation involves bringing rogue targets back into compliance with an end state definition. Once the target is reconciled, the classification of rogue may be removed, and the target may follow the gold image as described above.

The reconciliation process may differ for different classifications of rogue targets. According to one embodiment, when the drift is caused by additional patches, drift manager 152 applies the patches to the current version of a gold image to create a new version of the gold image. The end state definition for the flocking group is also updated to include the additional patches. Once the new version of the gold image is published, each member of the flocking group may be updated with the additional patches. Thus, ad-hoc or emergency patches applied at a rogue target may be propagated to other members of the flocking group.

In one embodiment, when drift is caused by missing patches, drift manager 152 reconciles the rogue target by applying the missing patches to the rogue target. For example, a subscribed target may begin to drift when patches are rolled back or lost during other change management activities. In order to apply the missing patches, the rogue target's software copy may be overwritten with the image's current version.

Figure 17:
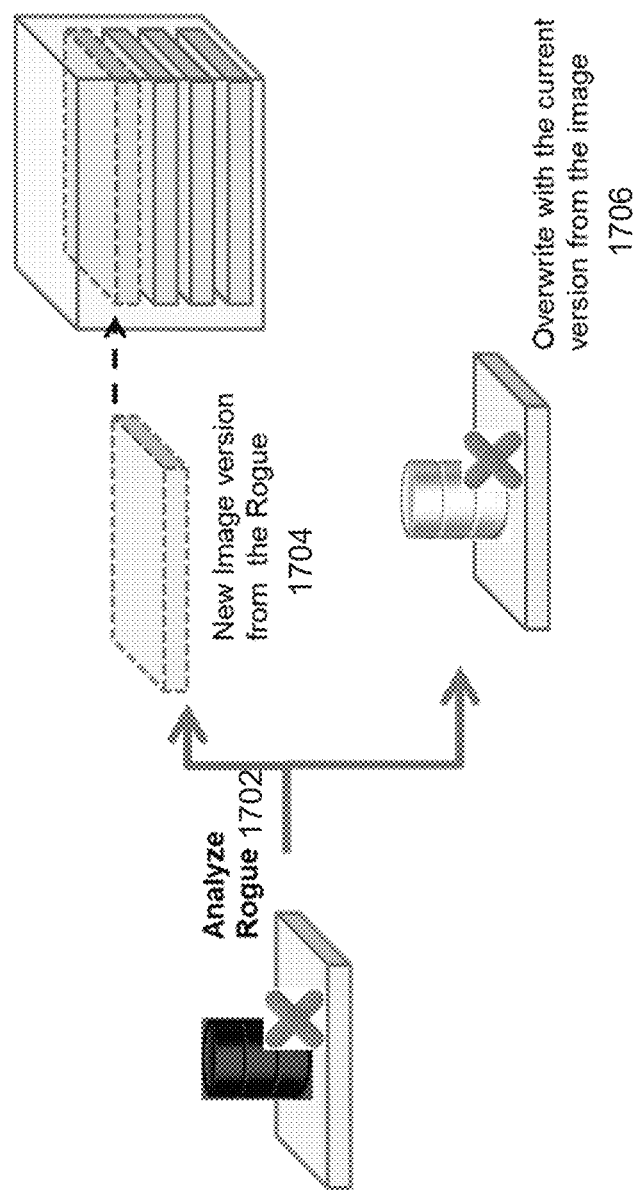
FIG. 17 illustrates different methods of reconciling a rogue target based on how the rogue target is classified.

FIG. 17 illustrates different methods of reconciling a rogue target based on how the rogue target is classified. At step 1702, a rogue target is analyzed to determine whether the drift is caused by additional patches or missing patches. For example, drift manager 152 may analyze the target properties of the rogue target to determine which patches have been applied at the target. Drift manager 152 may compare the applied patches to the end state definition for the flocking group to determine the cause of drift.

If the drift is caused by additional, drift patches (or a combination of additional and missing patches), then at step 1704, a new image version from the rogue is created and added to the gold standard. The new image version includes the additional patches that caused the rogue target to drift and patches the rogue target was missing, if any. If the drift is caused by missing patches and not additional patches, then at step 1706, the rogues target is overwritten with the current version of the image.

Reconciling Rogues with New Updates

In some embodiments, rogue targets may be permitted to drift until new versions of a gold image are created. For example, an administrator may apply an ad-hoc or emergency patch at a particular software application in a manner that does not comply with an end state definition. Drift manager 152 may allow the software application to continue operating out of band until a new update for the software application is released from a vendor or other service provider. Once the update is released, drift manager 152 may reconcile the rogue target back into the managed image versions.

Figure 18:
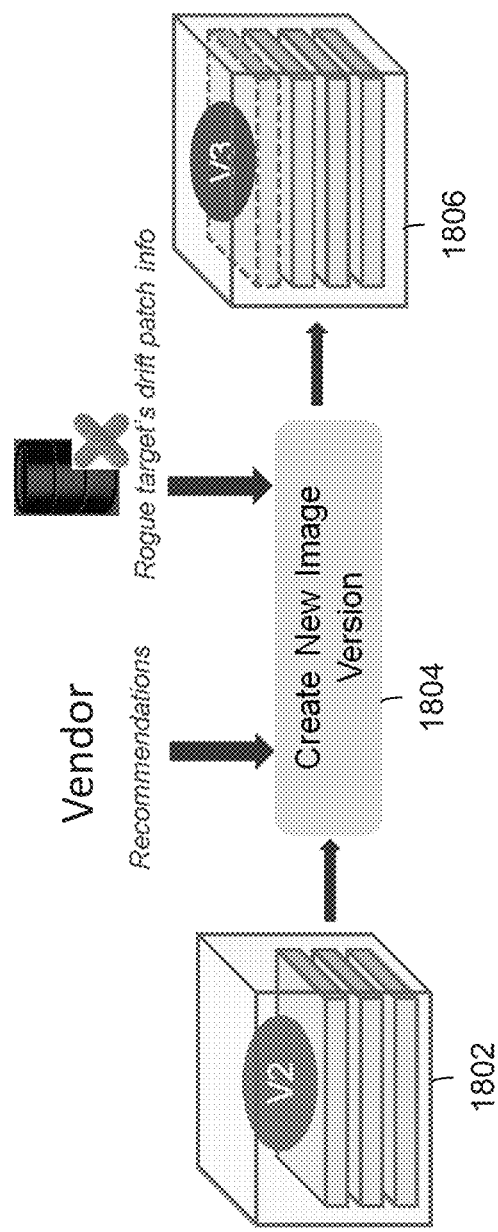
FIG. 18 illustrates an example image update that incorporates a rogue target's drift patches.

FIG. 18 illustrates an example image update that incorporates a rogue target's drift patches. At 1802, V2 is the current version of the gold image. In response to a vendor or service provider recommending an update, image creator 144 creates a new version of the gold image at 1804. To create new image version V3, image creator 144 applies a set of one or more drift patches from one or more rogue targets in addition to the recommended patches from the service provider. Image version V3 is added to the gold image and may be promoted to active status at 1806.

Target Additions

In some cases, a new target or group of targets may be added to and initialized within system 100 after the gold images have been created and the subscriptions formed. When a new target is added, image advisor 142 may analyze the target's attributes (e.g., primary and/or secondary) to classify the target and determine a flocking group for the new target to join. For example, when a request to initialize a target is received, the new target may be added to a flocking group of targets that share the same target type, software release version, and platform. Once added to the flocking group, the new target may be updated to match the latest version of the gold image. If the target does not fit with any other flocking group, a new flocking group may be formed.

In one embodiment, drift information for a newly initialized target may be generated and displayed by drift manager 152. In response to receiving a request to initialize a new target, drift manager 152 may compare the level of configuration of the new target with the source components specified in an end state definition for the flocking group to which the new target is added. If drift manager 152 determines that the new target does not satisfy the recommended end state for the flocking group, drift manager 152 may generate and display information that indicates that the new target differs from the standard level of configuration. Drift manager may further indicate in what way the new target differs from the standard level of configuration. For example, drift manager 152 may display a difference in the patch level of the new target and the recommended patch level associated with the end state definition.

Example Image Management Interface

In one embodiment, image advisor 142 provides a centralized interface and set of workflows through which a user may minimize configuration pollution and manage standards within system 100. The centralized interface may comprise a set of dashboards or other user interface elements that identify the current configuration levels of targets 112a to 112n and/or recommend different configuration levels.

FIGS. 19A to 19F depict example dashboards and other interfaces that may be used to manage the standardization process. FIG. 19 illustrates dashboard 1900, which displays a current state of software configurations within a data center and a recommended state of software configurations within the same datacenter. The display depicted by dashboard 1900 is in the context of database software installations and indicates the total number of database installations within the datacenter. However, in addition or as an alternative to displaying recommendations for database installations, the dashboard may be used to display configuration levels for other types of software installations.

Pie chart 1902 illustrates the total number of software configurations currently installed within the datacenter. Each slice of pie chart 1902 corresponds to a different software configuration level. Each slice of pie chart 1902 further represents one or more targets within the datacenter that are configured at the corresponding software configuration level.

Pie chart 1904 illustrates the recommended number of software configurations within the datacenter. Each slice of pie chart 1904 corresponds to a different recommended configuration level and end state definition. Each slice of pie chart 1904 further represents one or more targets that were grouped within a corresponding recommendation bucket. A user may select button 1906 to view recommended end state definitions and gold images for each of the recommendation buckets.

Figure 19A:
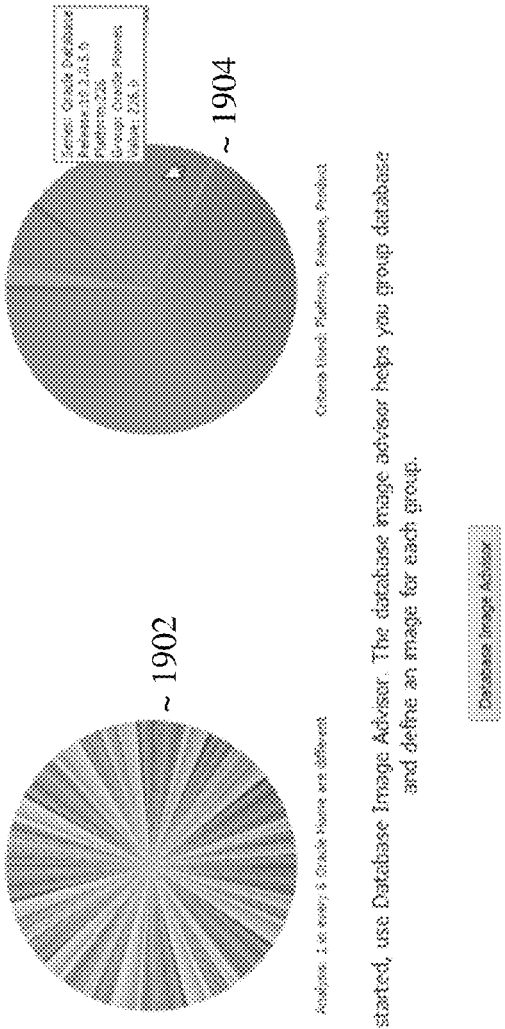
FIGS. 19A, 19B, 19C, 19D, 19E, and 19F illustrate example dashboards and other interfaces that may be used to manage the standardization process.
Figure 19B:
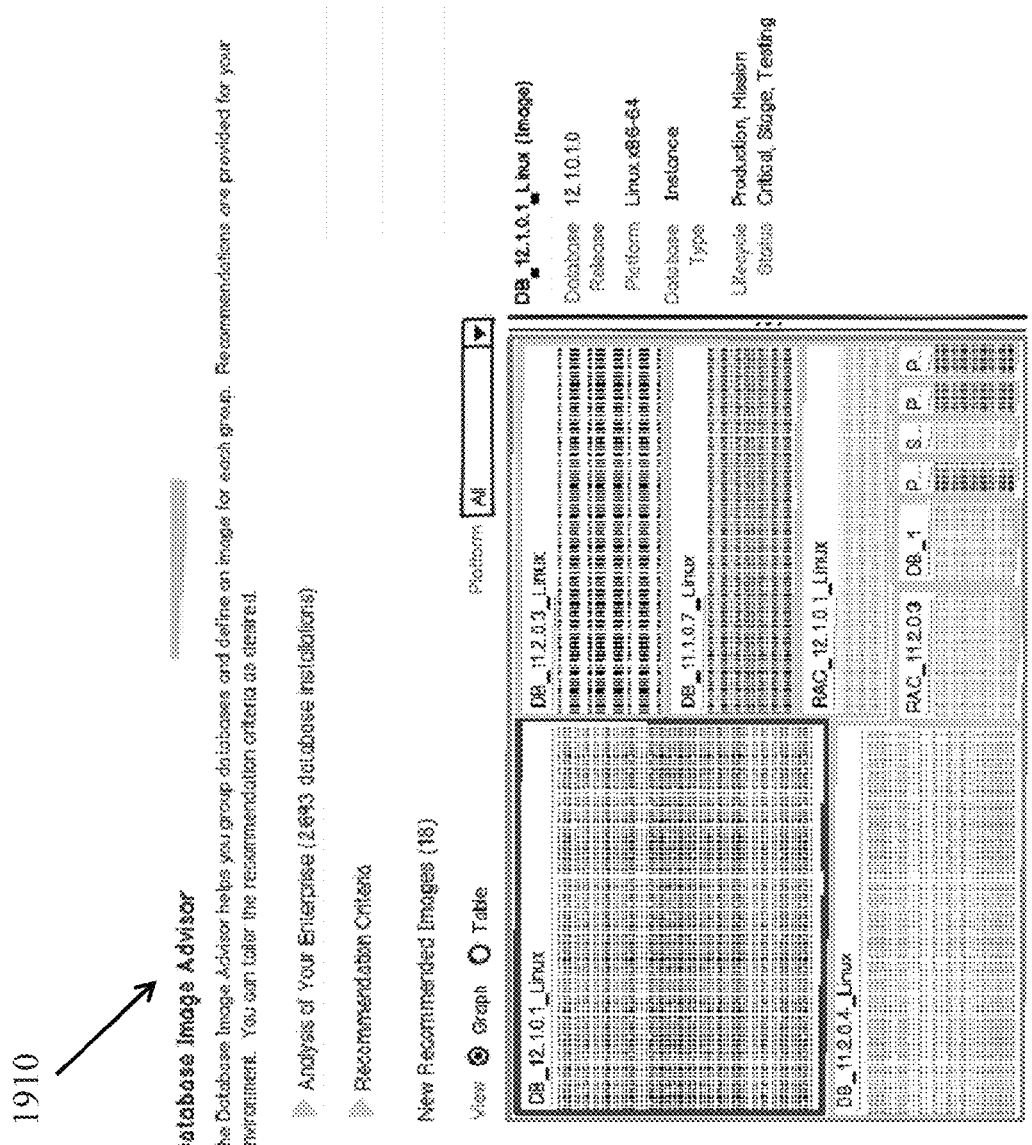

FIG. 19B illustrates dashboard 1910, which displays recommended end state definitions for different recommendation buckets. Within dashboard 1910, the user may navigate to view the analysis of the datacenter, which presents a display such as depicted in dashboard 1900. The user may further view and sort recommended gold images and end state definitions. The user may create new gold images based on the recommendations, or may refine the recommendation criteria to generate new recommendations.

Figure 19C:
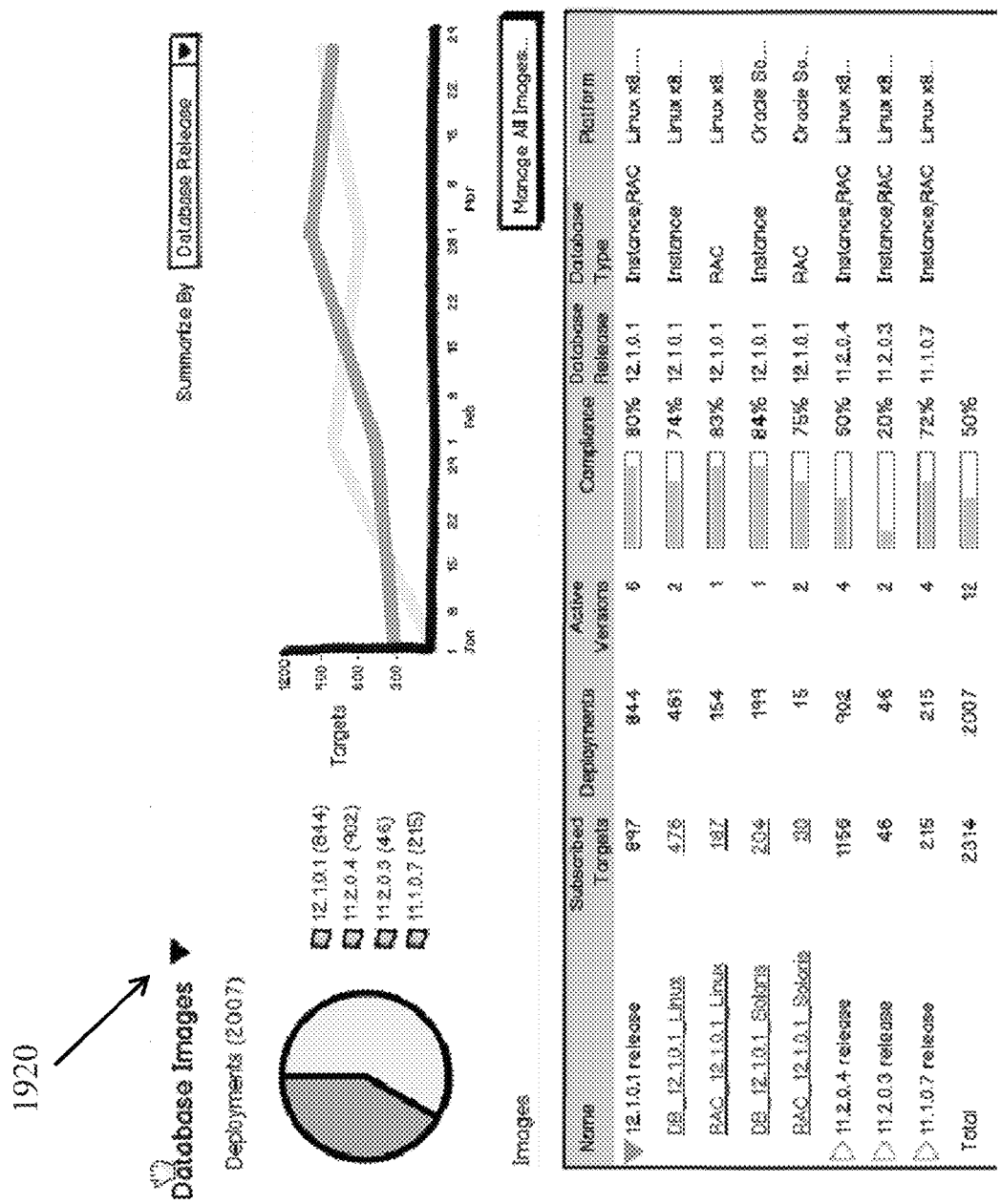

FIG. 19C illustrates dashboard 1920, which displays a centralized interface for monitoring images and subscribed members. The interface allows a user to view the total number of subscribed targets and active deployments that follow a particular gold image within a datacenter. The interface further depicts the number of active versions of a gold image and the percentage of subscribed targets that are in compliance with a gold image.

Dashboard 1920 further depicts statistics for groups of gold images. For example, the total number of subscribed targets, compliance percentage, and other combined statistics are shown for the 12.1.0.1 release, even though there are four separate gold images for the 12.1.0.1 release. In addition, dashboard 1920 depicts the total number of subscribed targets, deployments, active version and compliance percentage for the entire set of gold images within the datacenter environment.

Figure 19D:
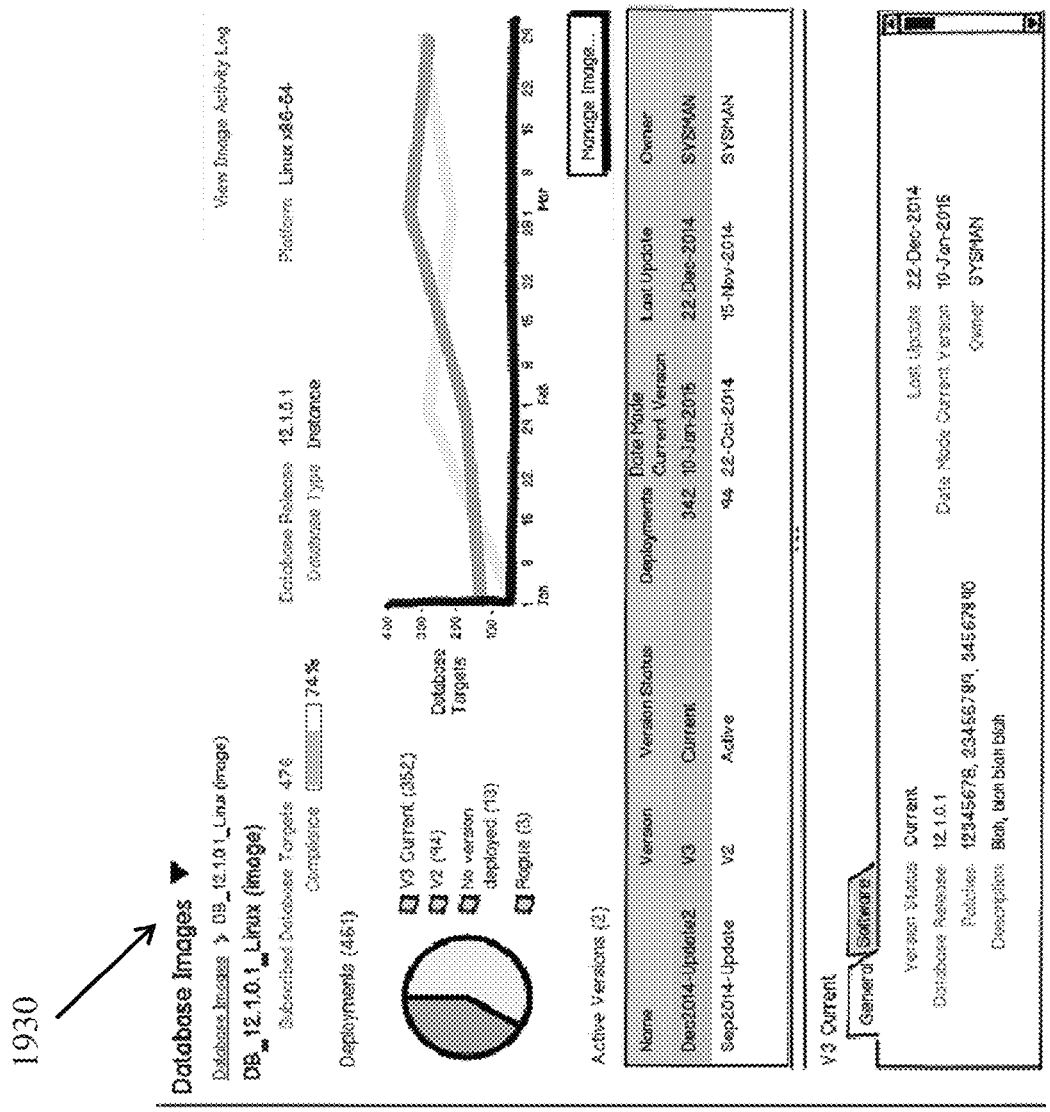

FIG. 19D illustrates dashboard 1930, which displays information about a selected gold image and its versions. Dashboard 1930 identifies which version of the gold image is current and older versions of the gold image that are still active. Dashboard 1930 further depicts how many deployments are following each active version of the gold image and how many deployments are rogue.

Figure 19E:
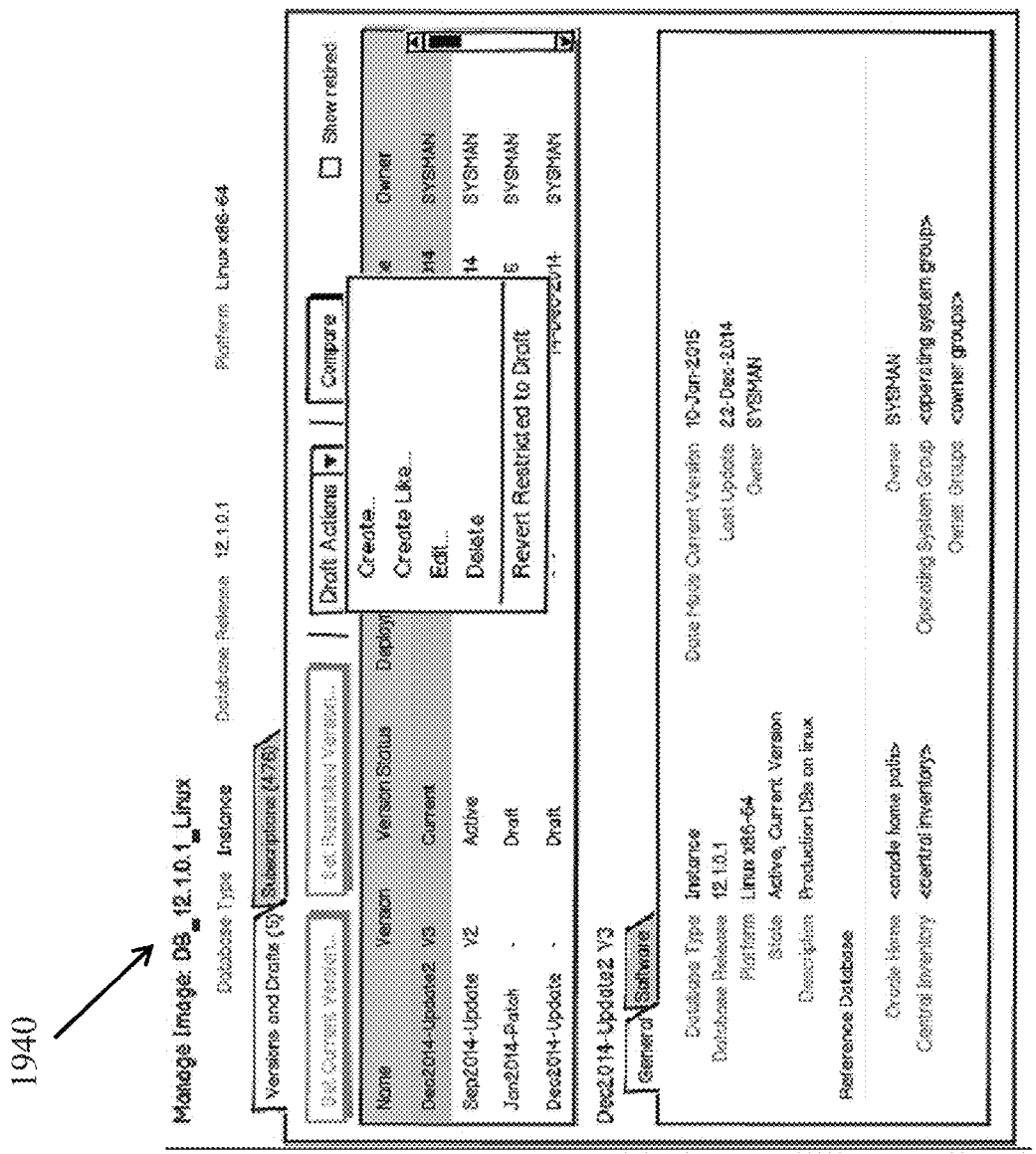

FIG. 19E illustrates dashboard 1940, which displays options for managing the states of different image versions within a gold image. Dashboard 1940 allows a user to drill down into the different versions and subscriptions associated with a gold image. Dashboard 1940 further allows the user to manage the state of newly create image versions. For example, the user may create, edit, or delete a draft version of a gold image. The user may further promote an image version to active restricted or active current status, or revert a restricted version to draft status.

Figure 19F:
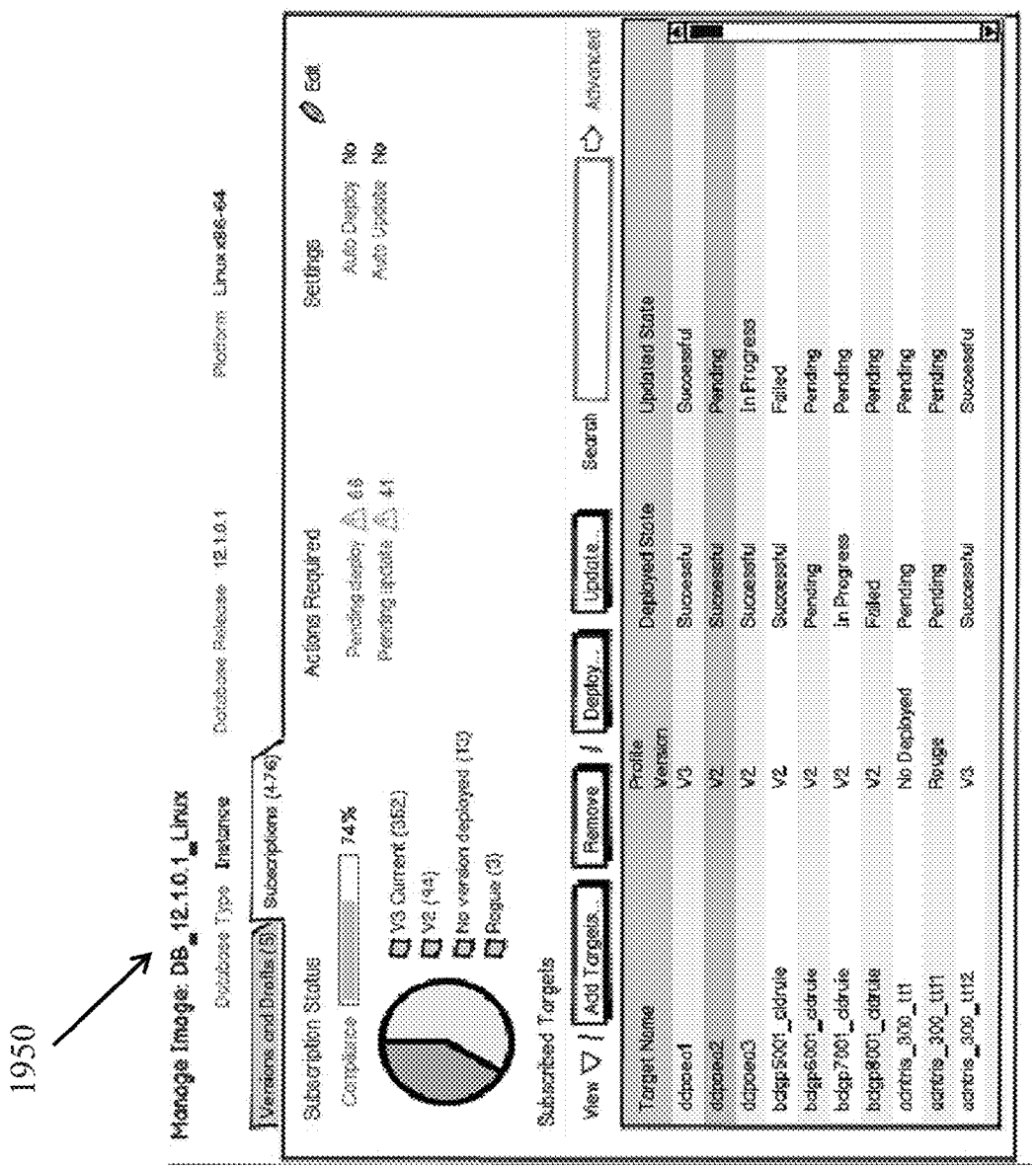

FIG. 19F illustrates dashboard 1950, which displays an action center to manage subscribed targets. From dashboard 1950, a user may perform actions including adding new members, updating non-compliant members, handling rogue targets, and viewing the update status of a target.

The above dashboards allow the user to understand the state of configuration pollution and standardization within an environment at any given point in time. The dashboards further provide charts and other interface elements for tracking inventory and trending to help the administrator understand the sprawl and ongoing changes within a datacenter environment.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 20:
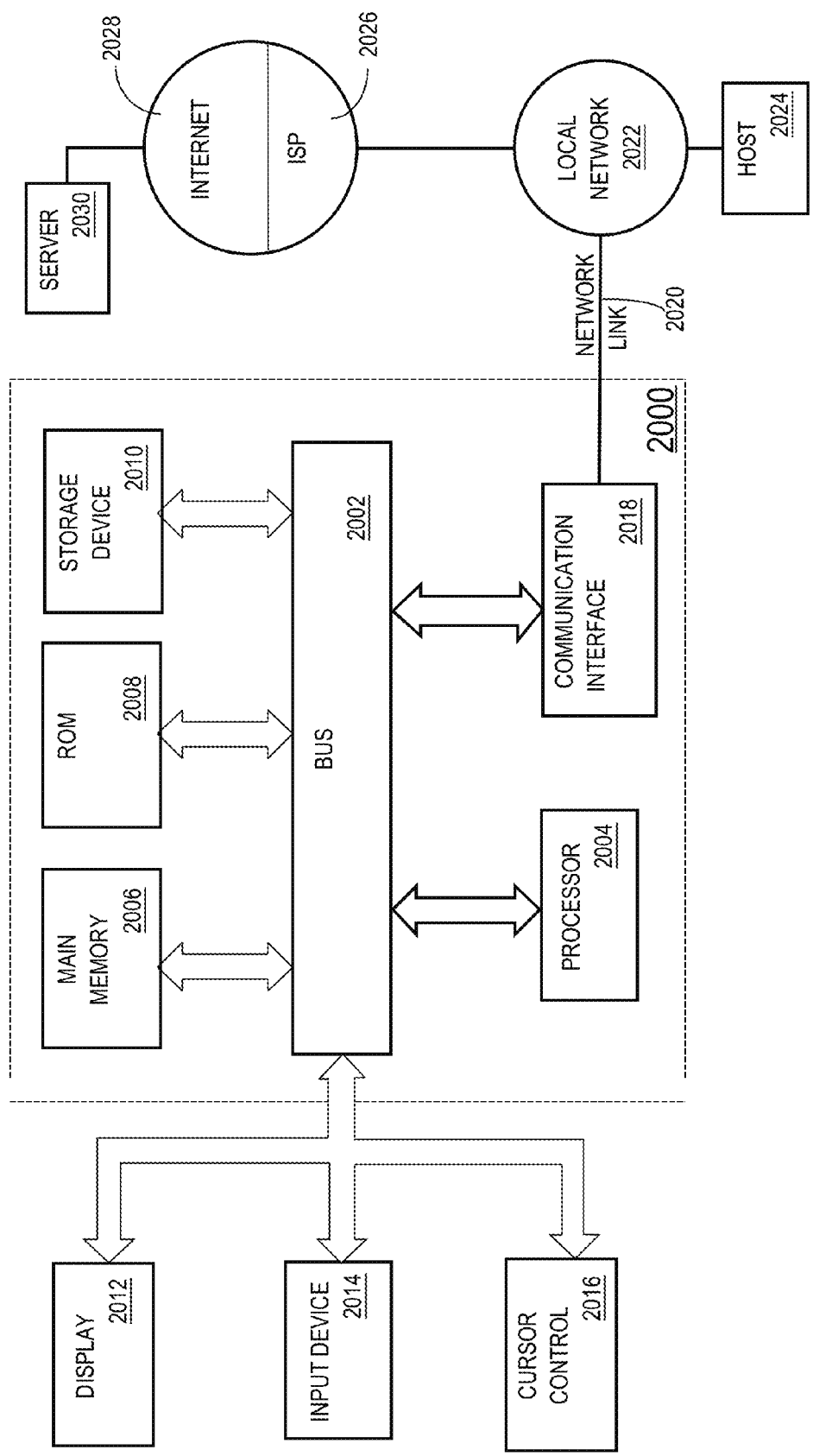
FIG. 20 is a block diagram that illustrates a computer system upon which an embodiment may be implemented.

For example, FIG. 20 is a block diagram that illustrates a computer system 2000 upon which an embodiment of the invention may be implemented. Computer system 2000 includes a bus 2002 or other communication mechanism for communicating information, and a hardware processor 2004 coupled with bus 2002 for processing information. Hardware processor 2004 may be, for example, a general purpose microprocessor.

Computer system 2000 also includes a main memory 2006, such as a random access memory (RAM) or other dynamic storage device, coupled to bus 2002 for storing information and instructions to be executed by processor 2004. Main memory 2006 also may be used for storing temporary variables or other intermediate information during execution of instructions to be executed by processor 2004. Such instructions, when stored in non-transitory storage media accessible to processor 2004, render computer system 2000 into a special-purpose machine that is customized to perform the operations specified in the instructions.

Computer system 2000 further includes a read only memory (ROM) 2008 or other static storage device coupled to bus 2002 for storing static information and instructions for processor 2004. A storage device 2010, such as a magnetic disk, optical disk, or solid-state drive is provided and coupled to bus 2002 for storing information and instructions.

Computer system 2000 may be coupled via bus 2002 to a display 2012, such as a liquid-crystal display (LCD) or a light-emitting diode (LED) display, for displaying information to a computer user. An input device 2014, including alphanumeric and other keys, is coupled to bus 2002 for communicating information and command selections to processor 2004. Another type of user input device is cursor control 2016, such as a mouse, a trackball, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane.

Computer system 2000 may implement the techniques described herein using customized hard-wired logic, one or more ASICs or FPGAs, firmware and/or program logic which in combination with the computer system causes or programs computer system 2000 to be a special-purpose machine. According to one embodiment, the techniques herein are performed by computer system 2000 in response to processor 2004 executing one or more sequences of one or more instructions contained in main memory 2006. Such instructions may be read into main memory 2006 from another storage medium, such as storage device 2010. Execution of the sequences of instructions contained in main memory 2006 causes processor 2004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks or magnetic disks, such as storage device 2010. Volatile media includes dynamic memory, such as main memory 2006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

The term "logic" as used herein includes computer or electrical hardware component(s), firmware, a non-transitory computer readable medium that stores instructions, and/or combinations of these components configured to perform one or more functions or actions, and/or to cause one or more functions or actions from another logic, method, and/or system. Logic may include am microprocessor controlled by executable code, a discreet logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logic units are described, it may be possible to incorporate the multiple logic units into one physical logic component. Similarly, where a single logic unit is described, it may be possible to distribute the single logic unit between multiple physical logic components.

Storage media is distinct from but may be used in conjunction with transmission media. Transmission media participates in transferring information between storage media. For example, transmission media includes coaxial cables, copper wire and fiber optics, including the wires that comprise bus 2002. Transmission media can also take the form of acoustic or light waves, such as those generated during radio-wave and infra-red data communications.

Various forms of media may be involved in carrying one or more sequences of one or more instructions to processor 2004 for execution. For example, the instructions may initially be carried on a magnetic disk or solid-state drive of a remote computer. The remote computer can load the instructions into its dynamic memory and send the instructions over a telephone line using a modem. A modem local to computer system 2000 can receive the data on the telephone line and use an infra-red transmitter to convert the data to an infra-red signal. An infra-red detector can receive the data carried in the infra-red signal and appropriate circuitry can place the data on bus 2002. Bus 2002 carries the data to main memory 2006, from which processor 2004 retrieves and executes the instructions. The instructions received by main memory 2006 may optionally be stored on storage device 2010 either before or after execution by processor 2004.

Computer system 2000 also includes a communication interface 2018 coupled to bus 2002. Communication interface 2018 provides a two-way data communication coupling to a network link 2020 that is connected to a local network 2022. For example, communication interface 2018 may be an integrated services digital network (ISDN) card, cable modem, satellite modem, or a modem to provide a data communication connection to a corresponding type of telephone line. As another example, communication interface 2018 may be a local area network (LAN) card to provide a data communication connection to a compatible LAN. Wireless links may also be implemented. In any such implementation, communication interface 2018 sends and receives electrical, electromagnetic or optical signals that carry digital data streams representing various types of information.

Network link 2020 typically provides data communication through one or more networks to other data devices. For example, network link 2020 may provide a connection through local network 2022 to a host computer 2024 or to data equipment operated by an Internet Service Provider (ISP) 2026. ISP 2026 in turn provides data communication services through the world wide packet data communication network now commonly referred to as the "Internet" 2028. Local network 2022 and Internet 2028 both use electrical, electromagnetic or optical signals that carry digital data streams. The signals through the various networks and the signals on network link 2020 and through communication interface 2018, which carry the digital data to and from computer system 2000, are example forms of transmission media.

Computer system 2000 can send messages and receive data, including program code, through the network(s), network link 2020 and communication interface 2018. In the Internet example, a server 2030 might transmit a requested code for an application program through Internet 2028, ISP 2026, local network 2022 and communication interface 2018.

The received code may be executed by processor 2004 as it is received, and/or stored in storage device 2010, or other non-volatile storage for later execution.

Cloud Computing Overview

The techniques described herein are implemented using one or more processing solutions, examples of which include distributed systems, clustered computing systems, and cloud computing systems. In an embodiment, system 100 is part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to system 100, or to other entities within this description, is controllable via an interface that is exposed at a cloud computing system.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating a value from an ordered set of attribute values that have been collated, the ordered set of attribute values identifying a set of source components from which a particular software deployment is run;
   generating for the particular software deployment, a first signature by applying a hash function to the value;
   storing, in at least one of volatile or non-volatile storage, mapping data that maps the first signature to the value;
   generating a second signature based on information that defines target source components for a set of software deployments that includes the particular software deployment, the second signature associated with a particular version of a gold image including the target source components, wherein one or more other signatures are associated with one or more other respective versions of the gold image;
   comparing the first signature with the second signature and the one or more other signatures to determine which version of the gold image the particular software deployment is currently following, if any;
   determining whether the set of source components satisfy the target source components by comparing the first signature with the second signature;
   in response to determining that the set of source components do not satisfy the target source components based on a comparison of the first signature and the second signature, performing a set of one or more operations to update the particular software deployment.

2. The method of claim 1, wherein the value is a string value that is formed based on the set of source components for the particular software deployment.

3. The method of claim 1, wherein the value represents text identifying the set of source components.

4. The method of claim 1, wherein the ordered set of attribute values includes a first set of one or more attribute values that identify a base version of the particular software deployment and a second set of one or more attribute values that identify a set of one or more patches that have been applied to the particular software deployment.

5. The method of claim 1, wherein the second signature is generated from an end state definition that comprises a set of attributes defining the target source components.

6. The method of claim 1, further comprising: comparing the second signature to a plurality of other signatures; wherein each respective signature of the plurality of other signatures identifies a corresponding set of source components of a different respective software deployment of a plurality of software deployments; based, at least in part, on said comparing the second signature to a plurality of other signatures, determining how many of the plurality of software deployments are currently in compliance with the target source components.

7. The method of claim 1, further comprising in response to determining that the set of source components do not satisfy the target source components, notifying a user that the particular software deployment has drifted from a recommended standard.

8. The method of claim 1, further comprising generating an updated signature for the particular software deployment based on one or more patches that were applied to the particular software deployment after the first signature was generated.

9. The method of claim 1, further comprising periodically generating an updated signature for the particular software deployment based on a set of target properties collected for the particular software deployment.

10. One or more non-transitory computer-readable media storing instructions which, when executed by one or more processors, causing operations comprising:
    generating a value from an ordered set of attribute values that have been collated, the ordered set of attribute values identifying a set of source components from which a particular software deployment is run;
    generating for the particular software deployment, a first signature by applying a hash function to the value;
    storing, in at least one of volatile or non-volatile storage, mapping data that maps the first signature to the value;
    generating a second signature based on information that defines target source components for a set of software deployments that includes the particular software deployment, the second signature associated with a particular version of a gold image including the target source components, wherein one or more other signatures are associated with one or more other respective versions of the gold image;
    comparing the first signature with the second signature and the one or more other signatures to determine which version of the gold image the particular software deployment is currently following, if any;

determining whether the set of source components satisfy the target source components by comparing the first signature with the second signature;

in response to determining that the set of source components do not satisfy the target source components based on a comparison of the first signature and the second signature, performing a set of one or more operations to update the particular software deployment.

11. The one or more non-transitory computer-readable media of claim 10, the value is a string value that is formed based on the set of source components for the particular software deployment.

12. The one or more non-transitory computer-readable media of claim 10, wherein the value represents text identifying the set of source components.

13. The one or more non-transitory computer-readable media of claim 10, wherein the ordered set of attribute values includes a first set of one or more attribute values that identify a base version of the particular software deployment and a second set of one or more attribute values that identify a set of one or more patches that have been applied to the particular software deployment.

14. The one or more non-transitory computer-readable media of claim 10, wherein the second signature is generated from an end state definition that comprises a set of attributes defining the target source components.

15. The one or more non-transitory computer-readable media of claim 10, wherein the instructions further cause: comparing the second signature to a plurality of other signatures; wherein each respective signature of the plurality of other signatures identifies a corresponding set of source components of a different respective software deployment of a plurality of software deployments; based, at least in part, on said comparing the second signature to a plurality of other signatures, determining how many of the plurality of software deployments are currently in compliance with the target source components.

16. The one or more non-transitory computer-readable media of claim 10, wherein the instructions further cause in response to determining that the set of source components do not satisfy the target source components, notifying a user that the particular software deployment has drifted from a recommended standard.

17. The one or more non-transitory computer-readable media of claim 10, wherein the instructions further cause generating an updated signature for the particular software deployment based on one or more patches that were applied to the particular software deployment after the first signature was generated.

18. The one or more non-transitory computer-readable media of claim 10, wherein the instructions further cause periodically generating an updated signature for the particular software deployment based on a set of target properties collected for the particular software deployment.

* * * * *

UNITED STATES PATENT AND TRADEMARK OFFICE
CERTIFICATE OF CORRECTION

PATENT NO. : 9,665,366 B2  
APPLICATION NO. : 14/603775  
DATED : May 30, 2017  
INVENTOR(S) : Kuchibhotla et al.

Page 1 of 1

It is certified that error appears in the above-identified patent and that said Letters Patent is hereby corrected as shown below:

In the Specification

In Column 2, Line 22, after "available" insert -- ; --.

In Column 7, Line 26, delete "and or" and insert -- and/or --, therefor.

In Column 10, Line 50, after "standardization" insert -- . --.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*